US011416130B2

(12) United States Patent
Sonnino et al.

(10) Patent No.: US 11,416,130 B2
(45) Date of Patent: Aug. 16, 2022

(54) MOVING APPLICATIONS ON MULTI-SCREEN COMPUTING DEVICE

(71) Applicant: Microsoft Technology Licensing, LLC, Redmond, WA (US)

(72) Inventors: Eduardo Sonnino, Seattle, WA (US); Scott D. Schenone, Seattle, WA (US); Spencer Lee Davis, Columbus, OH (US); Sergio Eduardo Rodriguez Virgen, Bothell, WA (US); Otso Joona Casimir Tuomi, Seattle, WA (US); TJ Rhoades, Seattle, WA (US); Young Soo Kim, Bellevue, WA (US); Panos Costa Panay, Redmond, WA (US); Trevor Cliff Noah, Sherman Oaks, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/717,988

(22) Filed: Dec. 17, 2019

(65) Prior Publication Data
US 2021/0096732 A1 Apr. 1, 2021

Related U.S. Application Data

(60) Provisional application No. 62/909,191, filed on Oct. 1, 2019.

(51) Int. Cl.
*G06F 3/0484* (2013.01)
*G06F 3/0488* (2013.01)
(Continued)

(52) U.S. Cl.
CPC ........ *G06F 3/04845* (2013.01); *G06F 1/1616* (2013.01); *G06F 3/0486* (2013.01);
(Continued)

(58) Field of Classification Search
CPC ............. G06F 3/04845; G06F 3/04842; G06F 3/04883; G06F 3/1423; G06F 2203/04803
See application file for complete search history.

(56) References Cited

U.S. PATENT DOCUMENTS

| 6,069,648 | A | 5/2000 | Suso et al. |
| 7,536,650 | B1 * | 5/2009 | Robertson ............. G06F 3/0481 |
| | | | 715/764 |

(Continued)

FOREIGN PATENT DOCUMENTS

| CN | 106681641 A | 5/2017 |
| CN | 107040719 A | 8/2017 |

(Continued)

OTHER PUBLICATIONS

Henry, "How to Optimize Apps for Folding Devices: Developing for the Multiscreen Form Factor", Retrieved from https://insights.samsung.com/2019/01/14/how-to-optimize-apps-for-folding-devices-developing-for-the-multiscreen-form-factor/, Jan. 14, 2019, 9 Pages.

(Continued)

*Primary Examiner* — James T Tsai
(74) *Attorney, Agent, or Firm* — Alleman Hall Creasman & Tuttle LLP

(57) ABSTRACT

Examples are related to operating a user interface of a dual-screen computing device. One example provides a computing device, comprising a first portion comprising a first display and a first touch sensor, and a second portion comprising a second display and a second touch sensor, the second portion connected to the first via a hinge, the hinge defining a seam between the first display and the second display. The computing device is configured to receive a touch input at the first display moving an application that is currently displayed on the first display and not on the second display toward the second display, detect the touch input (Continued)

releasing the application within a predetermined area, and span the application across the first display and the second display.

15 Claims, 23 Drawing Sheets

(51) Int. Cl.
    *G06F 3/14*         (2006.01)
    *G06F 3/0486*     (2013.01)
    *G06F 1/16*         (2006.01)
    *G06F 3/04845*    (2022.01)
    *G06F 3/04842*    (2022.01)
    *G06F 3/04883*    (2022.01)

(52) U.S. Cl.
    CPC ...... *G06F 3/04842* (2013.01); *G06F 3/04883* (2013.01); *G06F 3/1423* (2013.01); *G06F 2203/04803* (2013.01)

(56) References Cited

U.S. PATENT DOCUMENTS

| | | | |
|---|---|---|---|
| 8,194,001 B2 | 6/2012 | Miller et al. | |
| 8,330,347 B2 | 12/2012 | Kee et al. | |
| 8,504,936 B2 | 8/2013 | Gimpl et al. | |
| 8,599,106 B2 | 12/2013 | Gimpl et al. | |
| 8,890,802 B2 | 11/2014 | Case, Jr. et al. | |
| 9,207,717 B2 | 12/2015 | Sirpal et al. | |
| 9,478,124 B2 | 10/2016 | Henty | |
| 9,489,078 B2 | 11/2016 | Seo et al. | |
| 9,524,030 B2 | 12/2016 | Modarres et al. | |
| 10,048,827 B2 | 8/2018 | Gimpl et al. | |
| 10,204,592 B1* | 2/2019 | Trim | H04N 1/6075 |
| 10,291,873 B2 | 5/2019 | Hattar et al. | |
| 10,306,060 B1 | 5/2019 | Ellis et al. | |
| 2006/0107226 A1* | 5/2006 | Matthews | G06F 3/0481 |
| | | | 715/766 |
| 2010/0321275 A1 | 12/2010 | Hinckley et al. | |
| 2011/0003587 A1 | 1/2011 | Belz et al. | |
| 2011/0143769 A1 | 6/2011 | Jones et al. | |
| 2012/0081309 A1* | 4/2012 | Sirpal | G06F 3/0416 |
| | | | 345/173 |
| 2012/0084680 A1* | 4/2012 | Gimpl | G06F 3/0484 |
| | | | 715/761 |
| 2012/0084710 A1 | 4/2012 | Sirpal et al. | |
| 2012/0084720 A1* | 4/2012 | Sirpal | G06F 3/0483 |
| | | | 715/800 |
| 2012/0117495 A1 | 5/2012 | Sirpal et al. | |
| 2013/0080956 A1 | 3/2013 | Sirpal et al. | |
| 2013/0321340 A1 | 12/2013 | Seo et al. | |
| 2015/0067550 A1 | 3/2015 | Shin | |
| 2015/0100914 A1* | 4/2015 | Guan | G06F 3/04883 |
| | | | 715/781 |
| 2015/0365590 A1 | 12/2015 | Ishizuka | |
| 2015/0370322 A1* | 12/2015 | Gustafson | G09G 5/363 |
| | | | 345/156 |
| 2016/0062792 A1* | 3/2016 | Yuan | G06F 9/5022 |
| | | | 718/103 |
| 2016/0349974 A1* | 12/2016 | Louch | G06F 3/04847 |
| 2017/0052698 A1 | 2/2017 | Seo et al. | |
| 2018/0129459 A1* | 5/2018 | Sylvan | G06F 3/167 |
| 2018/0332205 A1 | 11/2018 | Hawthorne et al. | |
| 2019/0042066 A1* | 2/2019 | Kim | G06F 1/1618 |
| 2019/0056844 A1 | 2/2019 | Kang et al. | |
| 2019/0310720 A1 | 10/2019 | Angelevski et al. | |
| 2019/0369830 A1* | 12/2019 | Alonso Ruiz | G06F 9/451 |
| 2021/0096611 A1 | 4/2021 | Schenone et al. | |
| 2021/0099570 A1 | 4/2021 | Schenone et al. | |
| 2022/0030104 A1 | 1/2022 | Schenone et al. | |

FOREIGN PATENT DOCUMENTS

| | | |
|---|---|---|
| EP | 2674834 A2 | 12/2013 |
| EP | 3291523 A1 | 3/2018 |
| WO | 2010028406 A1 | 3/2010 |
| WO | 2020080639 A1 | 4/2020 |

OTHER PUBLICATIONS

Hinckley, et al., "Codex: A Dual Screen Tablet Computer", In Proceedings of the SIGCHI Conference on Human Factors in Computing Systems., Apr. 9, 2009, pp. 1933-1942.

Khalilbeigi, et al., "FoldMe: Interacting with Double-sided Foldable Displays", In the Proceedings of 6th International Conference on Tangible, Embedded and embodied Interaction., Feb. 19, 2012, pp. 33-40.

Patel, "Sprint's Kyocera Echo Dual-creen Android Phone Announced, We Go Handson (update)", Retried from: https://www.engadget.com/2011/02/07/sprints-kyocera-echo-dual-screen-android-phone-announced-we-go/, Feb. 7, 2011, 19 Pages.

Seifert, Dan, "ZTE's Axon M has Two Screens and a Hinge", Retrieved from: https://www.theverge.com/circuitbreaker/2017/10/17/16486484/zte-axon-m-dual-screen-phone-announcement-hands-on, Oct. 17, 2017, 04 Pages.

Spence, Ewan, "Microsoft Confirms Innovative Approach to New Dual-Screened Surface Devices", Retrieved From: https://www.forbes.com/sites/ewanspence/2019/10/13/microsoft-surface-duo-surface-neo-new-leak-feature-specs-patent-dual-screen-hinge/#52a3d5e7462b, Oct. 13, 2019, 3 Pages.

Spoonauer, Mark, "Galaxy Fold Review: The Future Is (Almost) Here", Retrieved from: https://web.archive.org/web/20191001215733/https:/www.tomsguide.com/reviews/samsung-galaxy-fold, Oct. 1, 2019, 24 Pages.

"International Search Report and Written Opinion Issued in PCT Application No. PCT/US2020/042434", dated Dec. 21, 2020, 24 Pages.

"International Search Report and Written Opinion Issued in PCT Application No. PCT/US2020/042435", dated Oct. 5, 2020, 13 Pages.

"International Search Report and Written Opinion Issued in PCT Application No. PCT/US2020/048965", dated Nov. 16, 2020, 15 Pages.

"Non Final Office Action Issued in U.S. Appl. No. 16/719,802", dated Feb. 16, 2021, 8 Pages.

"Non Final Office Action Issued in U.S. Appl. No. 16/719,740", dated Nov. 8, 2021, 16 Pages.

* cited by examiner

MOVING APPLICATIONS ON MULTI-SCREEN COMPUTING DEVICE

CROSS REFERENCE TO RELATED APPLICATIONS

This application claims priority to U.S. Provisional Patent Application Ser. No. 62/909,191, filed Oct. 1, 2019, the entirety of which is hereby incorporated herein by reference for all purposes.

BACKGROUND

Some mobile electronic devices, such as smart phones and tablets, have a monolithic handheld form in which a display occupies substantially an entire front side of the device. Other devices, such as laptop computers, include a hinge that connects a display to other hardware, such as a keyboard and cursor controller (e.g. a track pad).

SUMMARY

Examples are disclosed that relate to operating a user interface of a multi-screen computing device. One example provides a computing device, comprising a first portion comprising a first display and a first touch sensor, and a second portion comprising a second display and a second touch sensor, the second portion connected to the first portion via a hinge, the hinge defining a seam between the first display and the second display. The computing device is configured to receive a touch input at the first display moving an application that is currently displayed on the first display and not on the second display toward the second display, detect the touch input releasing the application within a predetermined area, span the application across the first display and the second display such that a portion of application content is hidden behind the seam, receive a touch input moving the spanned application, and move the spanned application in a direction of the touch input to reveal at least a portion of the application content hidden behind the seam.

Another example provides a computing device, comprising a first portion comprising a first display and a first touch sensor, a second portion comprising a second display and a second touch sensor, the second portion connected to the first portion via a hinge, the hinge defining a seam between the first display and the second display, a logic device, and a storage device holding instructions executable by the logic machine. The instructions are executable to receive a touch input at the first display moving an application from the first display toward the second display, when the touch input releases the application within a first predefined area, to move the application to the second display, and when the touch input releases the application within a second predetermined area, to span the application by displaying the application across the first display and the second display.

Another example provides a method enacted on a computing device, the computing device comprising a first portion comprising a first display and a first touch sensor, and a second portion comprising a second display and a second touch sensor, the second portion connected to the first portion via a hinge. The method comprises displaying a first application on the first display, displaying a second application on the second display, receiving a touch input at the first display moving the first application toward the second display, detecting the touch input releasing the application within a predetermined area, and stacking the first application over the second application on the second display based at least upon the touch input releasing the application within the predetermined area.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
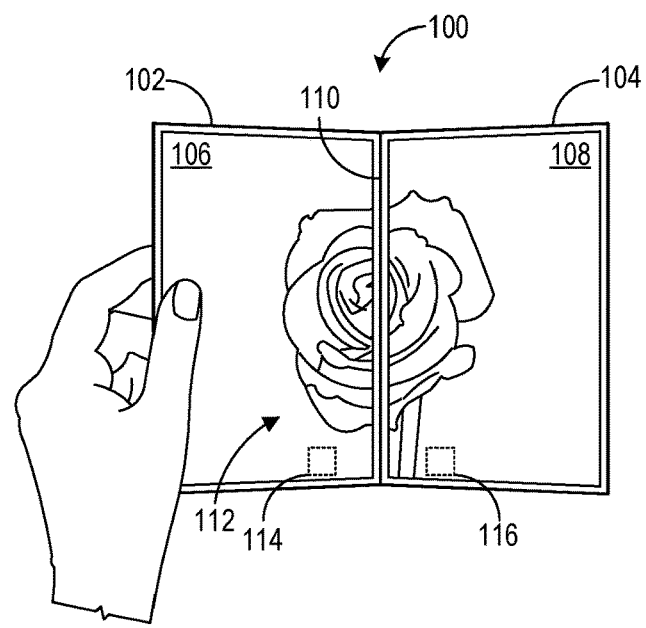
FIG. 1 shows an example multi-screen computing device.

The disclosed examples relate to a computing device having a multi-screen configuration. FIG. 1 shows an example multi-screen computing device in the form of a dual-screen computing device 100. The computing device 100 includes a first portion 102 and a second portion 104 that respectively include a first display 106 and a second display 108. A hinge 110 arranged between the first and second portions 102 and 104 allows the relative pose between the portions and their displays to be adjusted. The computing device 100 may be configured to determine the relative pose between the first and second portions 102 and 104 (e.g. via motion sensor data from one or more motion sensors in each portion), and adjust a function of the computing device based on the relative pose.

Each of the first display 106 and the second display 108 may be a touch-sensitive display having a touch sensor. The touch sensor(s) may be configured to sense multiple sources of touch input, such as a digit of a user and a stylus manipulated by the user, and may sense multiple concurrent touches. The computing device 100 may assume any suitable form, including but not limited to various mobile devices (e.g., foldable smart phone, tablet, or laptop).

The first portion 102 includes a first three-dimensional pose sensor system 114 configured to provide output indicative of a three-dimensional pose of the first portion 102, and the second portion 104 includes a second three-dimensional pose sensor system 116 configured to provide output indicative of a three-dimensional pose of the second portion 104. In some examples, the first and second pose systems 114 and 116 each includes an accelerometer and a gyroscope, and optionally a magnetometer. The output produced by the first and second pose systems 114 and 116 may be used to determine a three-dimensional pose of first and second portions 102 and 104, respectively. In other examples, any other suitable sensor or sensors may be used to sense the relative orientations of the displays, such as an optical or mechanical encoder incorporated into the hinge.

Figure 2:
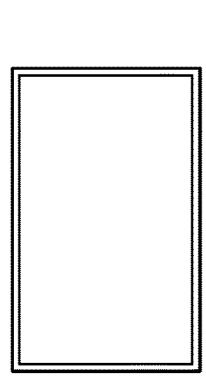
FIGS. 2-5 show example poses for a dual-screen computing device.
Figure 3:
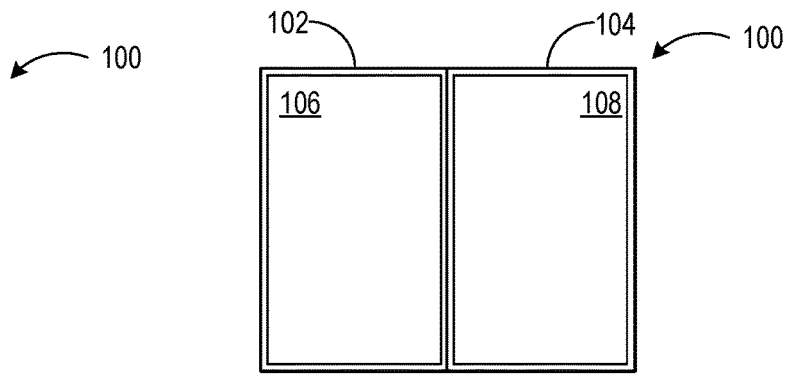
Figure 4:
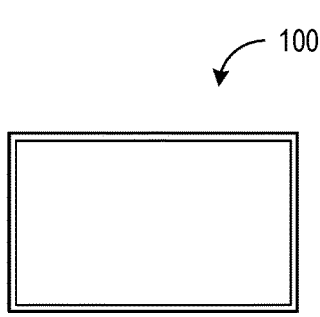
Figure 5:
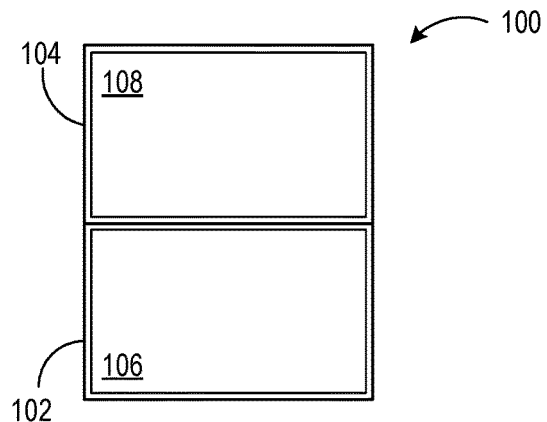

FIGS. 2-5 show various example display poses for the dual-screen computing device 100. More specifically, FIG. 2 shows a single portrait pose (in which either display 106 or 108 may face the user), FIG. 3 shows a double portrait pose, FIG. 4 shows a single landscape pose (in which either display 106 or 108 may face the user), and FIG. 5 shows a double landscape pose. Depending on a pose of the computing device 100, a user interface of the computing device 100 may be configured to operate in a certain manner and/or respond to touch inputs differently. For example, in FIG. 2 and FIG. 4, the second portion 104 may be folded via the hinge 110 behind the first portion 102, or vice versa. From the perspective of a user of the computing device 100, when the second display is folded behind the first portion, the second display 108 may be imperceptible. As such, the computing device 100 may render graphical content that was previously displayed across both the first display 106 and the second display 108 fully onto the first display 106, may cease displaying images on the second display 108, and/or may also cease receiving touch inputs on the second display 108. Various examples of operating a user interface and responding to touch inputs based on the pose of the computing device are further described below.

Figure 6A:
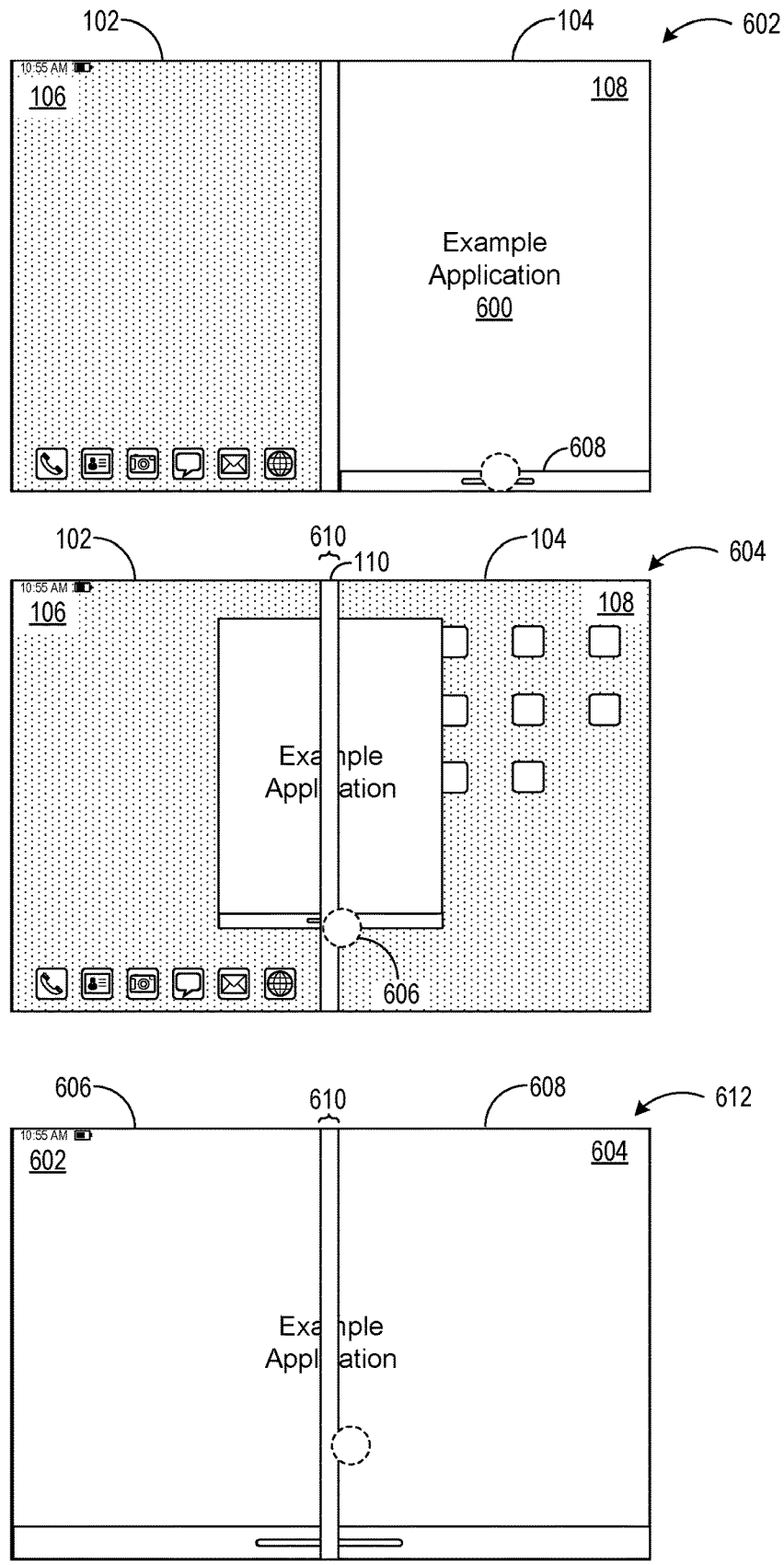
FIGS. 6A and 6B show an example spanning of an application and an example revealing of content of the spanned application that is hidden by a hinge.
Figure 6B:
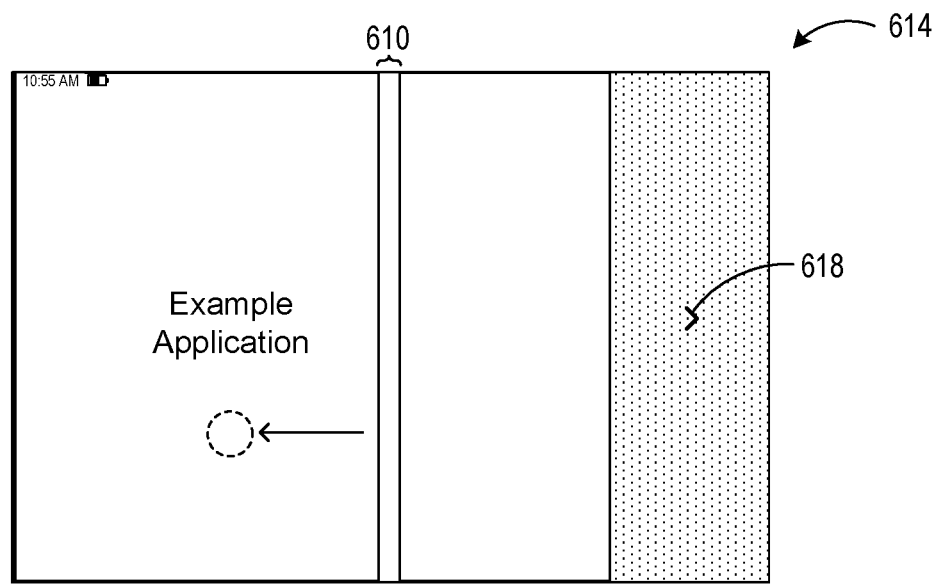

In some examples, a touch input may span an application across both a first display and a second display of a dual-screen device. FIGS. 6A and 6B show an example user interface displayed when spanning an application 600 across the first display 106 and the second display 108 of the first portion 102 and the second portion 104 of the dual-screen device 100. First, the user interface at 602 shows application 600 open on the second display 108 of the second portion 104, while the first display 106 on the first portion 102 is unoccupied by any applications. At 604, the user interface shows that a touch input 606 has dragged the application 600 from the second display 604 toward the first display 602. The touch input 606 may originate at a location along an application navigation bar 608 that is displayed at the bottom of the application 600. The application navigation bar 608 may be configured to receive user inputs related to moving, dismissing, or otherwise manipulating the application 600. The touch input 606 may release the application 600 when the application 600 is in a predetermined area, e.g. within a threshold distance from a seam 610 in between the two displays (as defined by the hinge 110 that connects the two device portions). Example predetermined areas for triggering certain user interface actions are discussed in more detail in regard to FIGS. 12-17.

The user interface at 612 shows the application 600 spanned across both displays in response to the touch input releasing the application 600. A mask may be applied to a rendering of the application in a location corresponding to the seam 610 when the application is spanned. Such masking may help the display of the spanned application (and also application windows moving across the seam) to appear more natural, as opposed to splitting the full image between the two displays. However, such masking also causes a small area of the displayed application to be unviewable. As such, a user may desire to reveal the content being blocked by the seam. FIG. 6B at 614 and 616 show example interactions in which a user moves the application 600 (e.g. by touching and dragging) to reveal content hidden by the seam 610. Any suitable touch inputs may trigger offsetting of the application to reveal content behind the seam 610. As examples, a touch input may swipe, touch and drag, or perform a multi-finger gesture to the left or right from the seam, from a seam corner, etc. in double portrait mode. The same touch inputs may apply except in up or down directions from the seam in double landscape mode. At 614, the user interface shows a touch input moving the application toward the left, and at 616, the user interface shows a touch input moving the application toward the right. The spanned application may thereby be moved in a direction of the touch input to reveal at least a portion of the application content hidden behind the seam. In either example, a user may then move the application back to the original spanned mode shown at 612, such as by tapping a revealed arrow user interface control 618 or 620 (shown at 614 and 616), or by dragging and releasing the application back toward the seam. In other examples, such masking may not be applied, and instead the application may be divided into two portions that together make up the entire image. In yet other examples, such a seam between multiple displays may not be present, or a seam may also be configured to display content (e.g. via a flexible display over the hinge).

Figure 7:
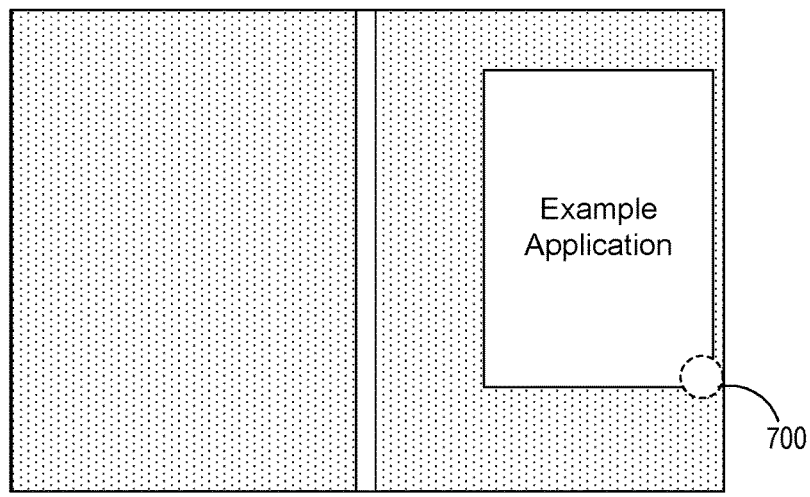
FIGS. 7-9 illustrate an example scaling of an application in response to a user touch input dragging the application.
Figure 8:
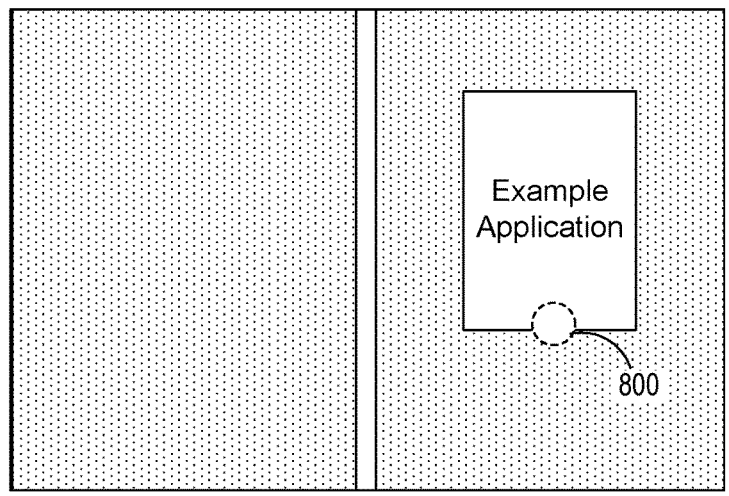
Figure 9:
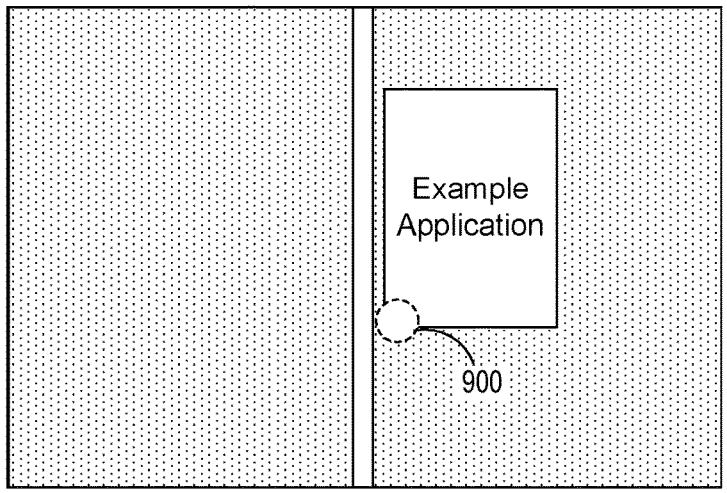

In some examples, a touch input may move an application while scaling the application simultaneously. FIGS. 7-9 illustrate an example of the scaling of a displayed application in response to a user touch input dragging the application. As shown, an origin of the scaling of the application may be set dynamically by horizontal touch position. For example, FIG. 7 shows a touch input 700 that starts at a right bottom corner of the application, FIG. 8 shows a touch input 800 that starts at a middle of the bottom of the application, and FIG. 9 shows a touch input 900 that starts at a left bottom corner of the application. In these examples, the scaling decreases based upon a vertical movement distance from the bottom of the display, and an origin of the movement is based upon the initial touch location of the touch input. The dynamic positioning of the origin of scaling may help to create the effect that the application follows the user's finger or stylus. The automatic scaling that occurs with movement of an application may help to better indicate to the user that the application is currently being moved while keeping the content of the application visible. Further, once released, expansion of the application back to its original size may also help to better indicate to the user that the application is no longer being moved by user input. Automatic scaling when moving an application may further help provide a more seamless transition of the application to a recent applications list or task switcher for switching between applications, as examples. For example, a preview for a recent applications list may be triggered when a gesture velocity for moving application drops to within a threshold velocity close to zero.

Figure 10:
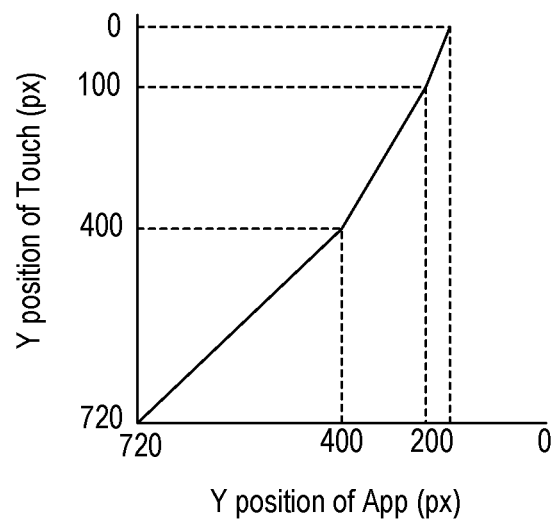
FIG. 10 shows a plot of an example vertical movement of an application as a function of touch position in a Y direction.

In some examples, an application may be moved in response to a horizontal movement and scaled in response to a vertical movement in portrait poses, and moved in response to a vertical movement and scaled in response to a horizontal movement in landscape poses. Further, the ratio of movement of the touch input to movement of the application on the user interface may change as a function of touch position. FIG. 10 shows a plot of an example vertical movement of an application on a display as a function of touch position in a Y direction when the display device is in a portrait pose. In this example, the position of an application follows a user's touch in a 1:1 ratio from a Y position of pixel 720 to pixel 400. Next, from a Y of touch from pixels 400 to 100, the change in Y position of the application compared to the change in touch location varies at a ratio of less than 1:1 from pixels 400 to 200. From Y of touch at pixels 100 to 0, the Y position of the application versus the touch position linearly varies at even a lesser ratio. In other examples, any other suitable mapping of touch movement to application movement may be used.

Figure 11:
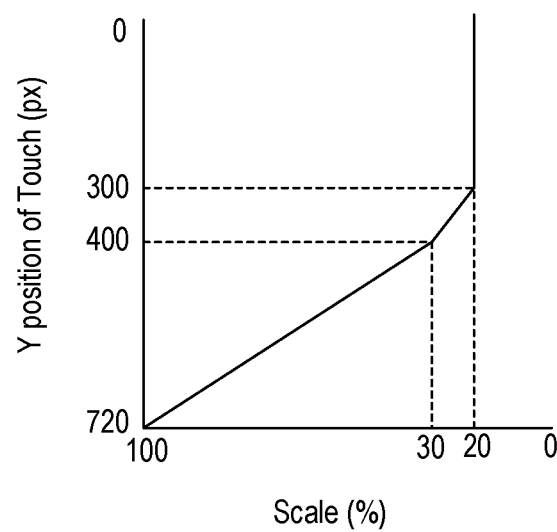
FIG. 11 shows a plot of an example application scaling as a function of touch position in a Y direction.

Likewise, the application scaling also may change as a function of touch position. FIG. 11 shows a plot of an example application scaling as a function of touch position in a Y direction. From Y of touch at pixels 720 to 400, the application may scale linearly at a first rate from 100% to 30% scale; from Y of touch at pixels 400 to 300, the application may scale linearly, but at a lesser rate, from 30% to 20% scale; and from Y of touch less than 300, the scale of the application may remain at 20%, thus not decreasing further. In the depicted example, movement of the application in a horizontal direction while in a portrait mode may follow the user's touch in a 1:1 ratio at all positions of X, and horizontal movement may not cause the application to scale, as an example. Movement of an application in a landscape mode also may display movement rate and/or scaling adjustments.

Figure 12:
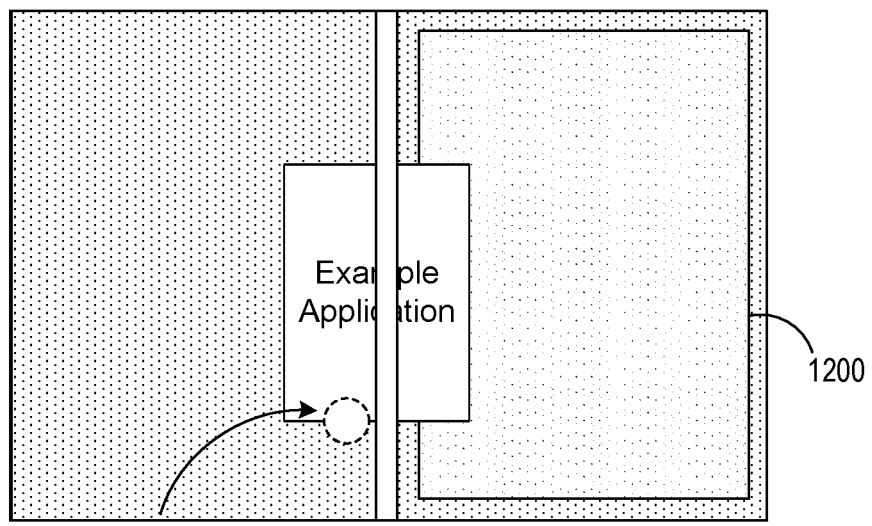
FIGS. 12 and 13 show example hint images displayed based on touch inputs moving an application from one display to another display.
Figure 13:
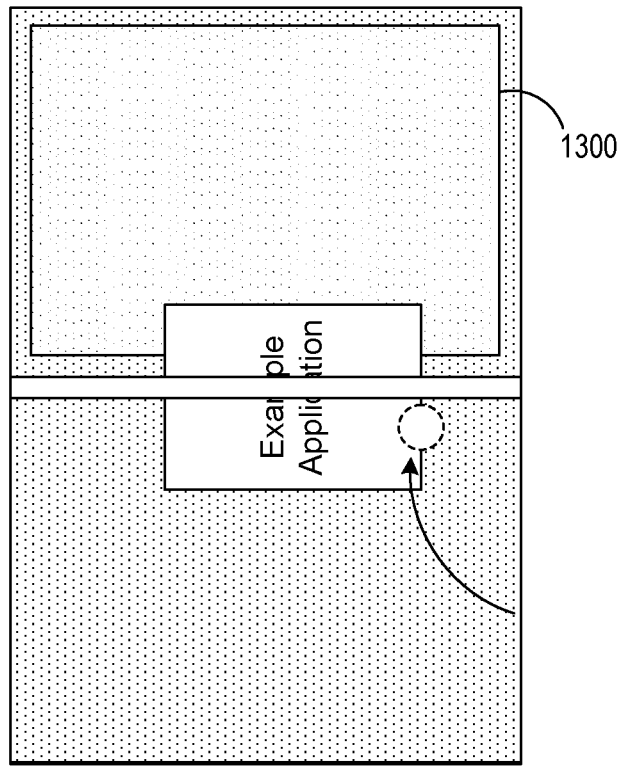

In double portrait and double landscape poses, movement of the applications from one display to the other display may be accompanied by hint images that are displayed to indicate how an application may move or behave based on the touch input. FIGS. 12 and 13 show example hint images 1200 and 1300 that may be displayed while moving an application in a double portrait pose and a double landscape pose, respectively. The illustrated example hint images indicate that if a touch input currently dragging the application were to be released at the current location, then the application would snap to or move to the display on which hint image is displayed.

Figure 14:
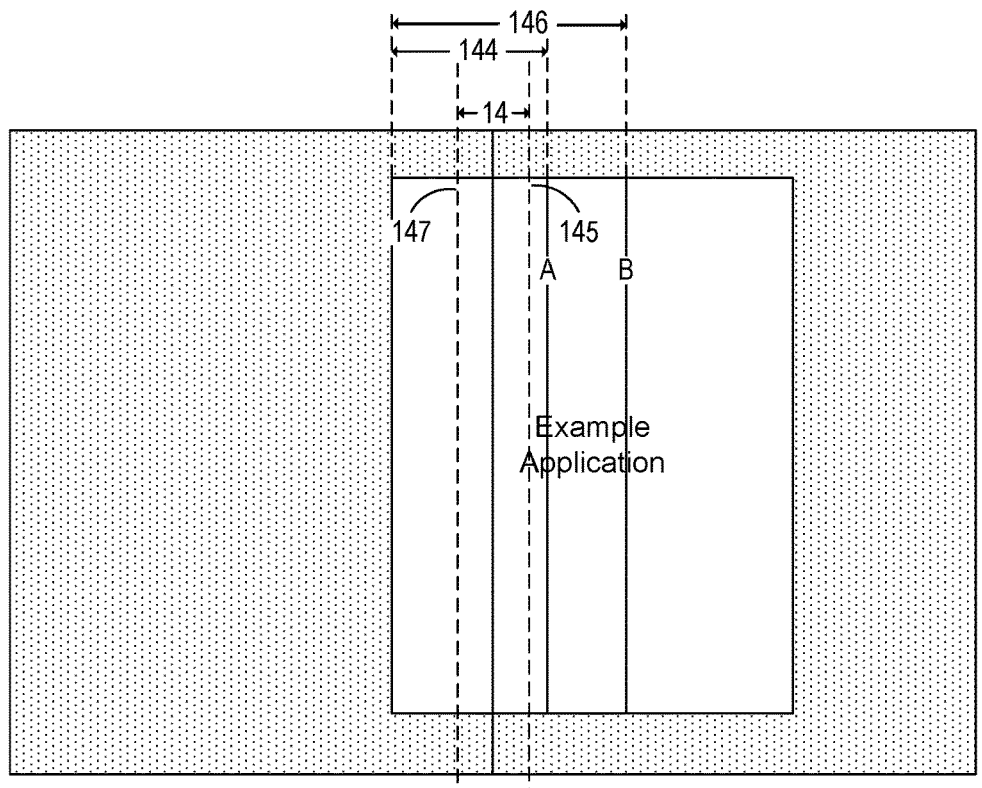
FIGS. 14-17 show example hint images displayed based on touch inputs crossing various threshold distances.

FIGS. 14-17 show example hint images displayed based on touch inputs moving an application to within example threshold distances. In these figures, a transition zone 14 occupies a portion of the first display, and a portion of the second display. FIG. 14 illustrates an example in which a touch input drags an application from the second display toward the first display. In this figure, a first fraction 144 of the application, as defined from a left edge of the application to example line A, has not passed a first boundary 145 of the transition zone 14, and no hint images are yet displayed, indicating that if the touch input were to release the application at that position, the application would be displayed again at the original position without any movement.

Figure 15:
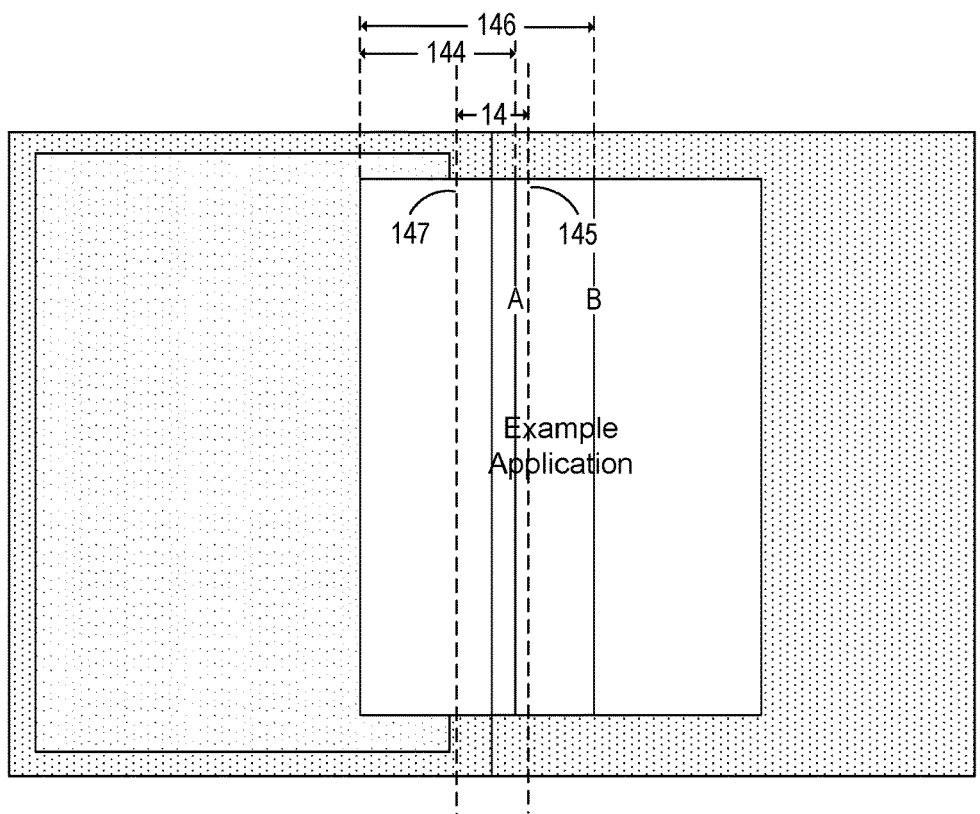
Figure 16:
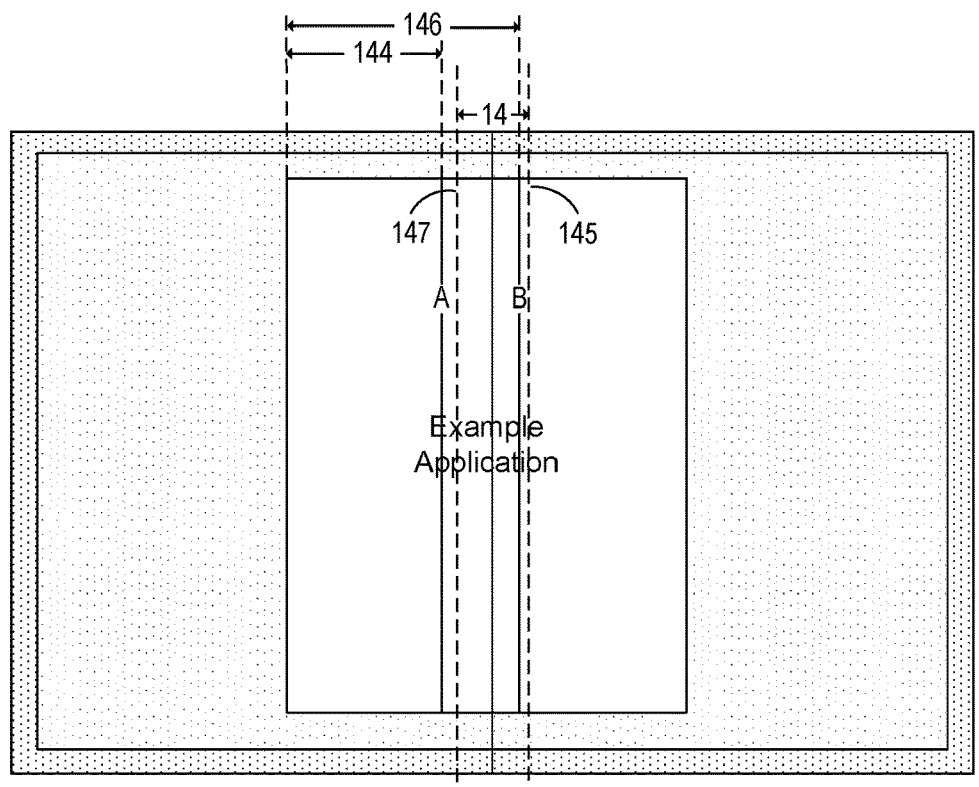
Figure 17:
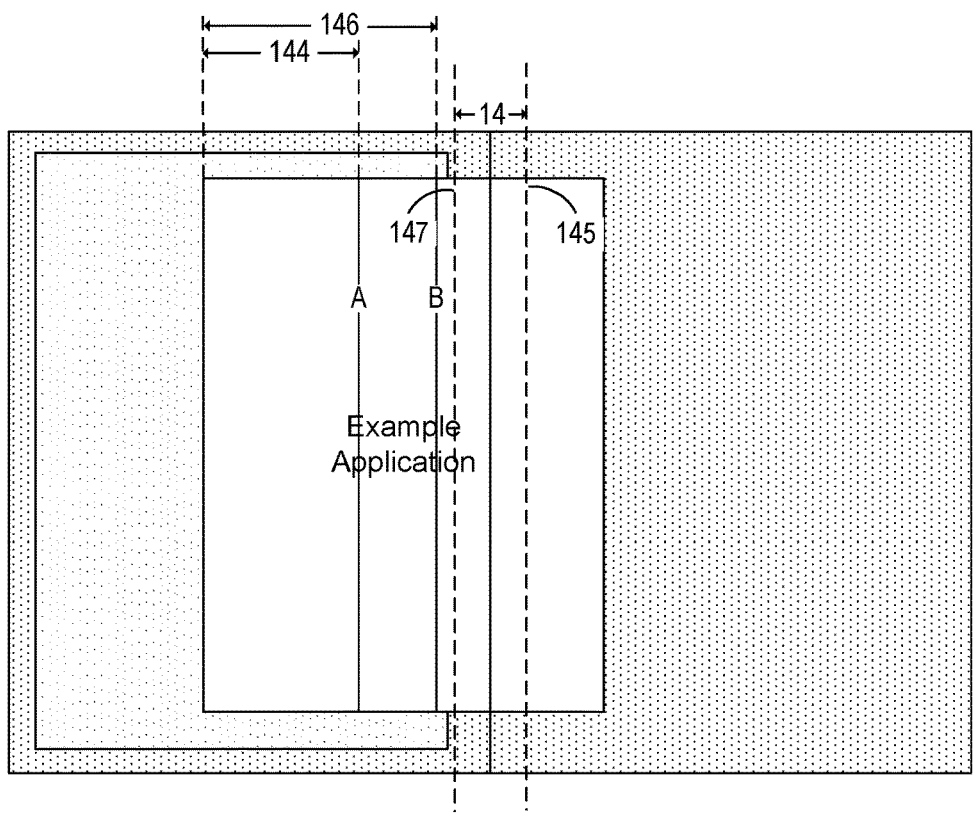

FIG. 15 shows the application having been moved sufficiently far such that the first fraction 144 of the application has passed the first boundary 145 of the transition zone 14. In response, a hint image is displayed on the first display, indicating that the application will move to the first display upon release. FIG. 16 shows that the application has been moved so that a second, larger fraction 146 of the application, as defined from a left edge of the application to example line B, passes the first boundary 145 of the transition zone 14, and in response a hint image is displayed spanning both displays, indicating that the application will span across both displays upon release. FIG. 17 shows that the application has been moved so that the second, larger fraction 146 of the application passes a second boundary 147 of the transition zone 14, and in response a hint image is displayed on the first display, indicating that the application will move to the first display upon release. As such, there may be more than one predetermined area to which an application may be moved to trigger a same action.

Figure 18:
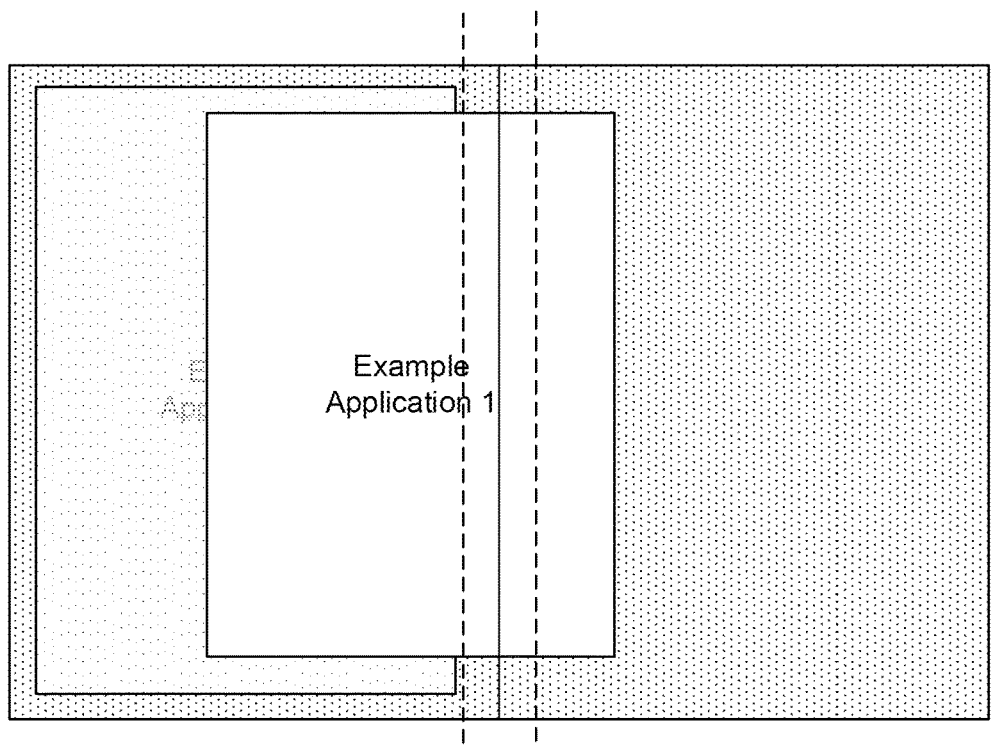
FIG. 18 shows an example hint image displayed in response to a touch input for stacking applications.

FIG. 18 shows an example hint image displayed in response to a touch input moving an application to a display currently occupied by another application. In this example, a touch input moves the application from the second display toward the first display, but the first display is already occupied by another application. Upon dragging the application a certain threshold distance (such as those shown in FIG. 15 and FIG. 17) or to a certain predetermined area, the other application on the left may slightly shrink and become greyed out as a hint image indicating that the dragged application would stack on top of the other application upon release and potentially cause the other application to close in some examples.

Figure 19:
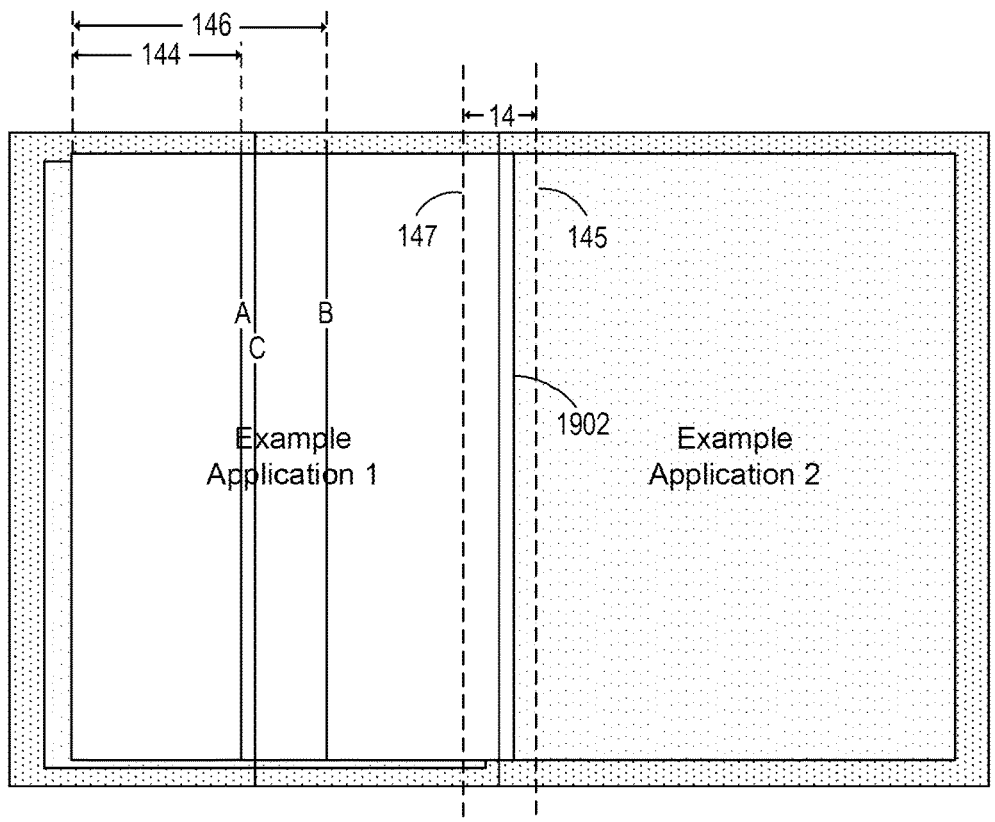
FIG. 19 shows an example hint image displayed in response to a touch input for swapping applications.

FIG. 19 shows an example hint image displayed in response to a touch input to swap applications. Here, the application has been dragged such that the first portion 144 of the application has passed an example swapping threshold line labeled as line C. Alternatively, the application may be dragged such that a far edge 1902 of the application passes the first boundary 145 into the transition zone 14. In response to either occurrence, a hint image is displayed showing the second application on the left at a smaller scale, and further showing the second application as a greyed out image on the second display, indicating that the application on the right will swap with the application on the left upon release. It will be understood that in some examples, hint images may not be displayed, but the same actions upon release within the predetermined areas may be applied regardless of whether hint images are displayed. Further, other suitable hint images may be used in other examples.

Figure 20:
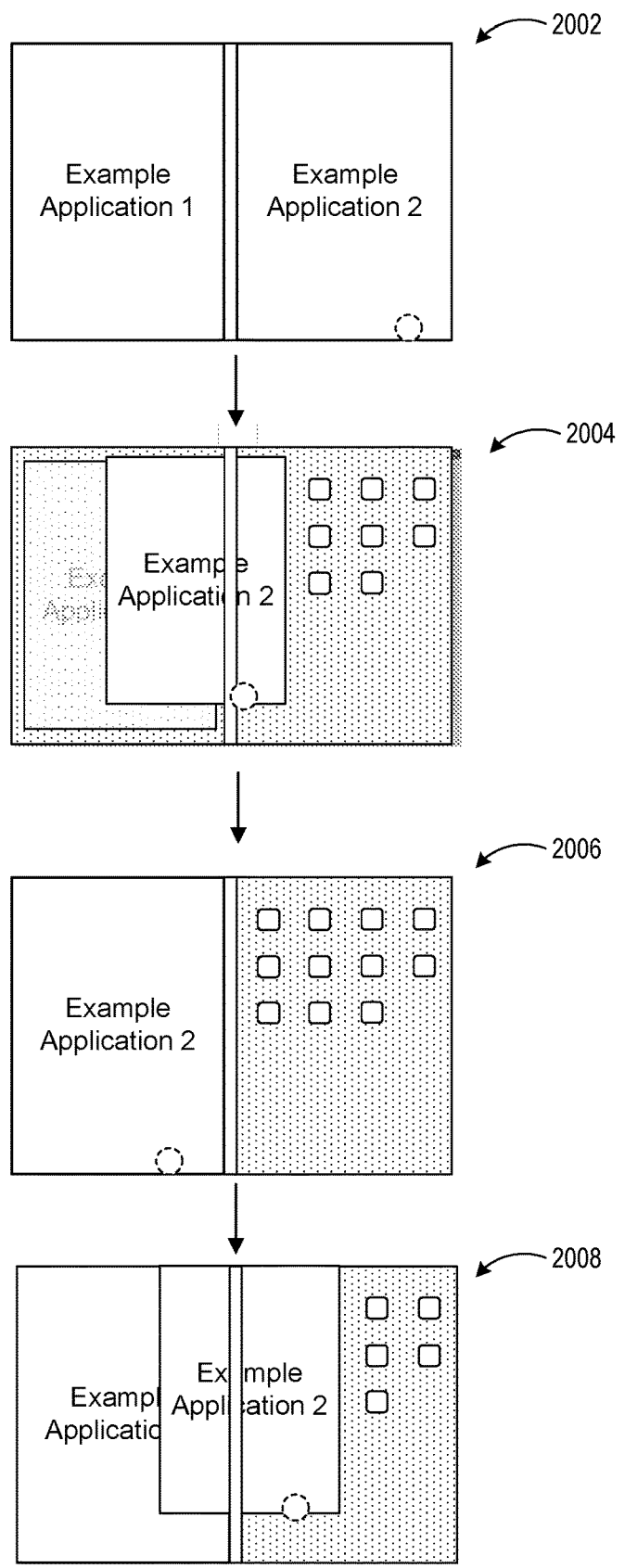
FIG. 20 shows an example user interface while stacking an application and then unstacking the application within a threshold time.

As mentioned above, in some examples, when a first application is moved from a first display to a second display that is already occupied by a second application, the first application is stacked on top of the second application. In some such examples, the second application may remain behind the first application indefinitely in a suspended state, until the first application is either moved away or dismissed. In other such examples, the second application may be dismissed automatically. In yet other examples, the second application may remain stacked behind the first application for a predetermined threshold amount of time, after which the second application may be dismissed and may then be accessible from a recent applications list. Within that threshold amount of time, a user may undo the stacking in order to reveal and resume the second application again. FIG. 20 shows an example user interface while stacking an application and then unstacking the application within a threshold time. At 2002, Application 1 is on the left display, and Application 2 is on the right display. At 2004, a touch input moves Application 2 toward the left display onto Application 1, and Application 1 is shown smaller and transparent, as an example hint image indicating the stacking and possible application dismissal At 2006, Application 2 has been stacked on top of Application 1. However, before a threshold amount of time has passed, a touch input moves Application 2 back toward the right display, as shown at 2008, thereby revealing Application 1 before it is dismissed. After the threshold amount of time, the dismissed application may be resumed again from a recent applications list, for example. Any suitable threshold time may be used. In some examples, the threshold time may be between five and twenty seconds, and may be ten seconds in a more specific example. Further, in some examples, an application that has become stacked underneath another application may instead (either immediately or after a predetermined threshold of time) be automatically transferred to a recent applications list for retrieval by the user.

In some examples, a user may trigger the launch of a new application from a currently open application, or a new instance of the same application. When in double portrait or double landscape mode, the new task may automatically be launched from the first application for display on the display opposite the first application, if that display is unoccupied.

Figure 21:
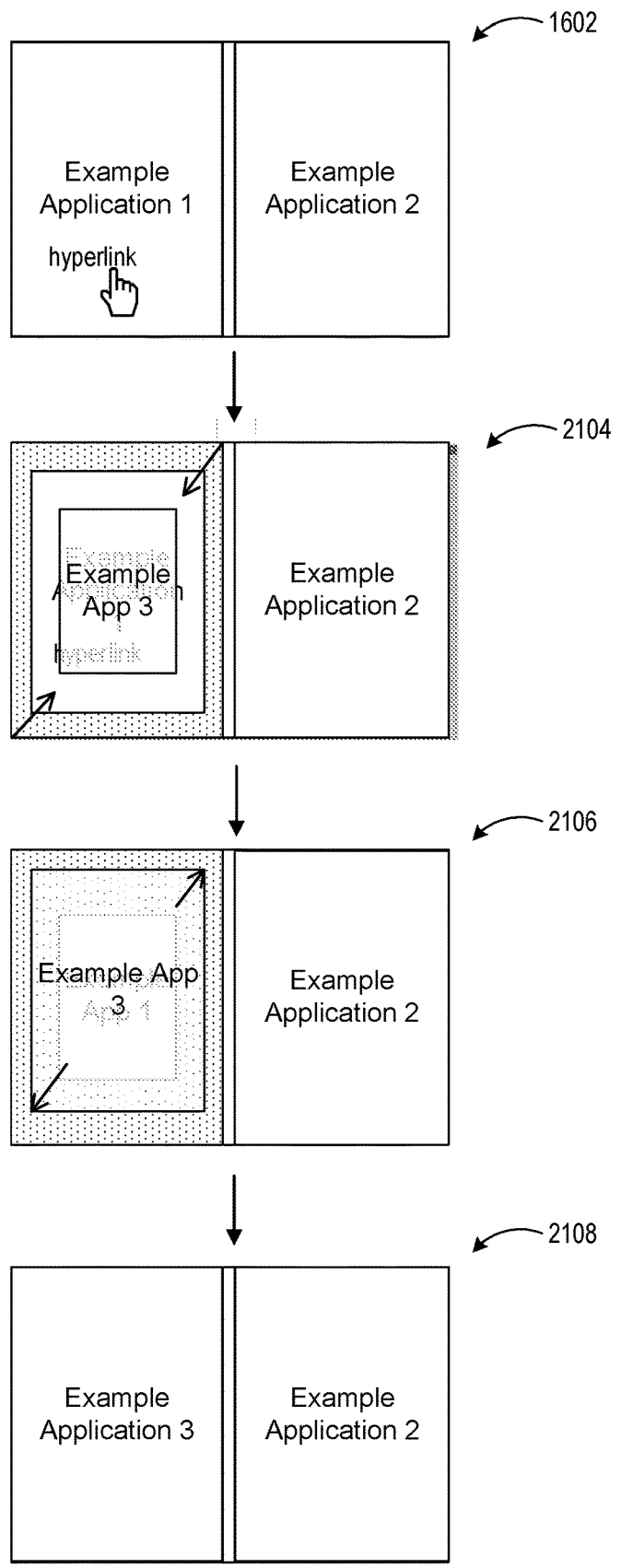
FIG. 21 shows an example user interface depicting launching a new task from a link in an application while another application is open on another display.

In some instances, the user may attempt to launch a new task from a currently opened application when the opposite display is already occupied. FIG. 21 shows an example user interface depicting launching a new task from a link in an application while another application is open on another display. At 2102, the left display is occupied by Application 1 which contains a link, and the right display is occupied by Application 2. At 2104, the user clicks on the link, which launches a new application, Application 3. Because the adjacent display is occupied, the new Application 3 opens on the same display as Application 1, stacking over Application 1 and suspending Application 1, as shown at 2106. Application 1 may be displayed as if it is receding and/or shrinking as Application 3 launches and expands to cover the left display. At 2108, Application 3 has been stacked on top of Application 1. In this instance, the stacking may not result in the automatic dismissal of Application 1. Application 1 may be restored, for example, by user retrieval from a recent applications list, as mentioned above, or by a user touch input dismissing or moving Application 3 to the adjacent display.

Figure 22:
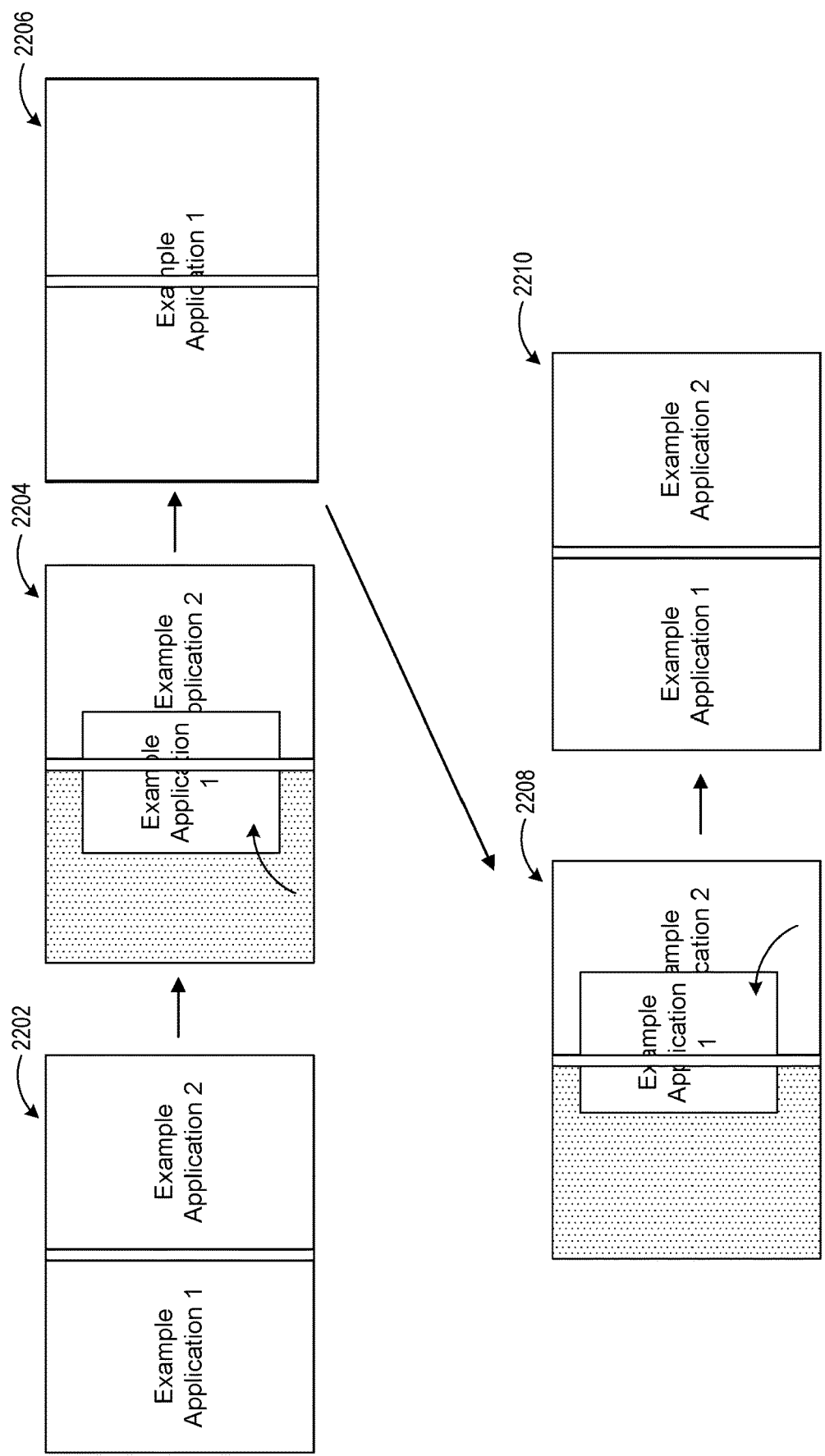
FIG. 22 shows an example user interface depicting spanning of an application over another application, and then contracting the application, thereby restoring the application beneath the spanned application.

Similarly, moving and spanning applications may behave differently depending on whether the display(s) are already occupied. FIGS. 22-26 show various examples of spanning, stacking, swapping, and dismissal of applications in response to movements of one application when one or more display(s) are already occupied by one or more other applications. FIG. 22 shows an example user interface depicting spanning of an application over another application and then contracting of the spanned application, thereby restoring the application beneath the spanned application. At 2202, Application 1 is displayed on the first display, and Application 2 is displayed on the second display. At 2204, a user touch input moves Application 1 toward the seam, and releases to span Application 1 across both displays, stacking Application 1 over Application 2 on the second display, as shown at 2206. At 2208, a user touch input contracts Application 1 and moves Application 1 back to the first display. At 2210, Application 2 is revealed and restored.

Figure 23:
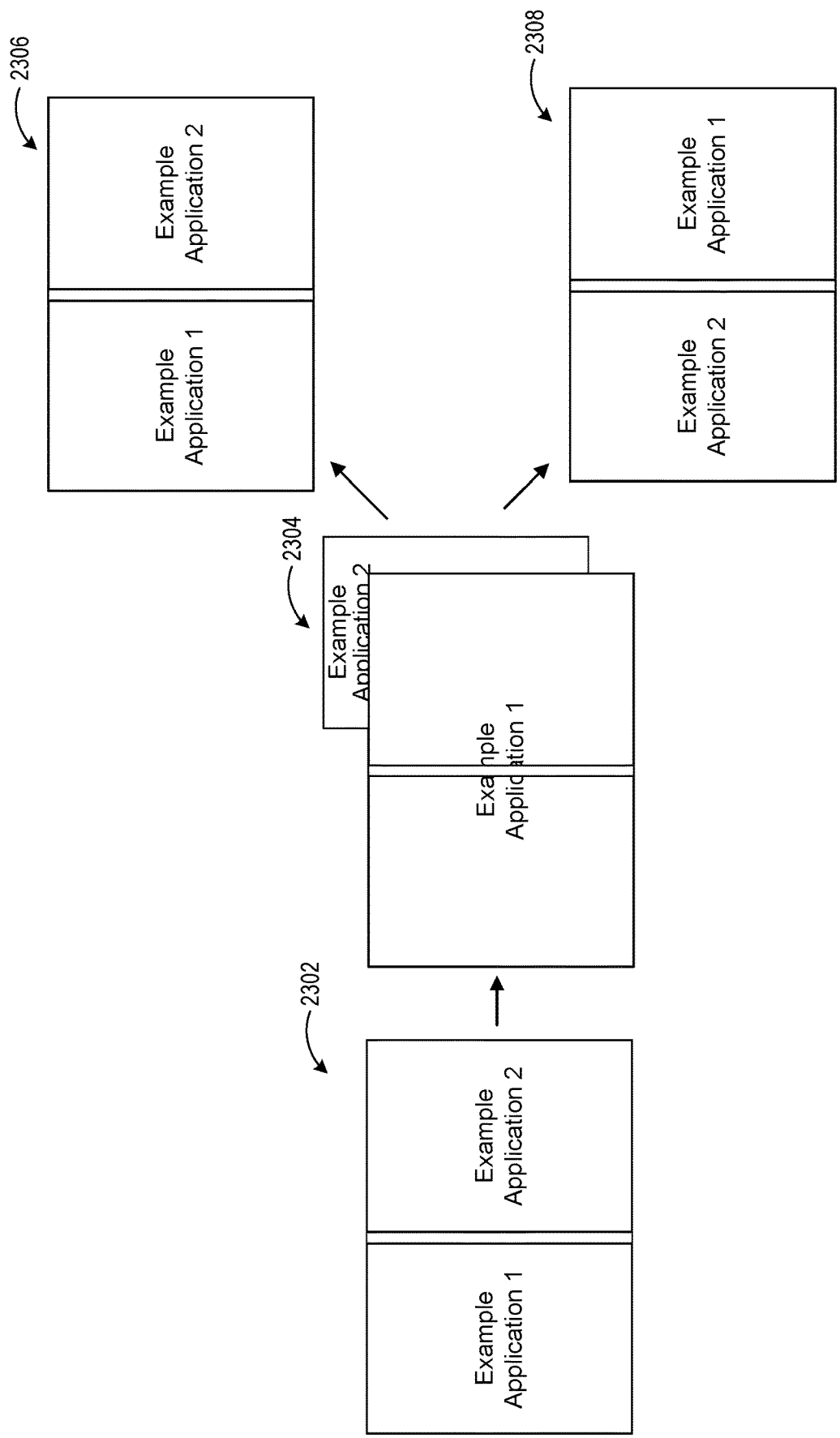
FIG. 23 shows an example user interface depicting spanning an application when another application is open on another display, and contracting the spanned application to either display, where a swap occurs if the spanned application is contracted to the other display.

FIG. 23 shows spanning and contracting an application when another application is open on another display, and also shows different outcomes as a result of contracting Application 1 to different screens. At 2302, Application 1 is displayed on the first display, and Application 2 is displayed on the second display. At 2304, Application 1 is shown spanned across both displays, e.g. after a touch input dragging and releasing Application 1 near the seam, thereby stacking at least a portion of Application 1 over Application 2 on the second display. The user may contract Application 1 back toward the first display, restoring Application 2 on the second display, as shown at 2306. Alternatively, the user may contract Application 1 toward the second display. Rather than stacking Application 1 over Application 2, Application 1 may be automatically swapped with Application 2, such that Application 2 is displayed on the first display, as shown at 2308. In other examples, swapping may be triggered when contracting a spanned application by moving the spanned application to a "swap threshold area" within an outer edge of the display, e.g. as illustrated in FIG. 19. If the contracted application is released outside of the swap threshold area, it may result in permanent stacking.

Figure 24:
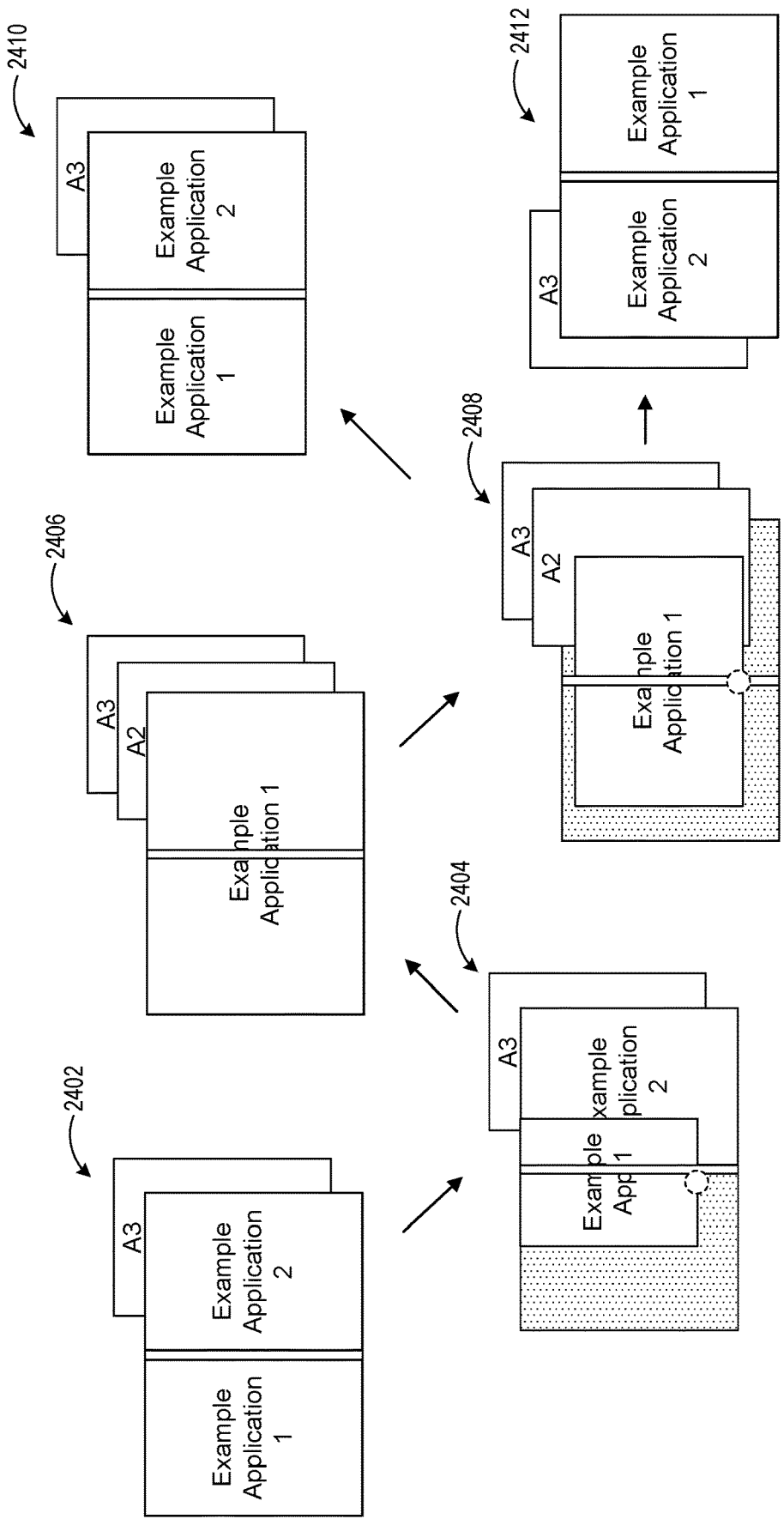
FIG. 24 shows an example user interface depicting spanning an application when two other applications are stacked on another display, and contracting the spanned application to either display, where a swap occurs if the spanned application is contracted to the other display.

FIG. 24 shows spanning and contracting of an application when two other applications are stacked on another display. At 2402, Application 1 is displayed on the first display, and Application 2 is displayed on the second display while stacked over Application 3. At 2404, a user touch input moves Application toward the seam, and upon release, Application 1 spans across both displays, stacking over both Application 2 and Application 3 on the second display, as shown at 2406. At 2408, a user input contracts spanned Application 1, but depending on which side Application 1 is contracted to, the result is different. At 2410, Application 1 is shown contracted to the first display, restoring the original arrangement. However, as shown at 2412, when the spanned application is contracted at the second display where the stacked applications were originally located, the stacked applications swap locations with the spanned application. As mentioned above, in other examples, swapping may be triggered when contracting the spanned application to a "swap threshold area" within an outer edge of the display, and stacking may result when the spanned application is released outside of the swap threshold area.

Figure 25:
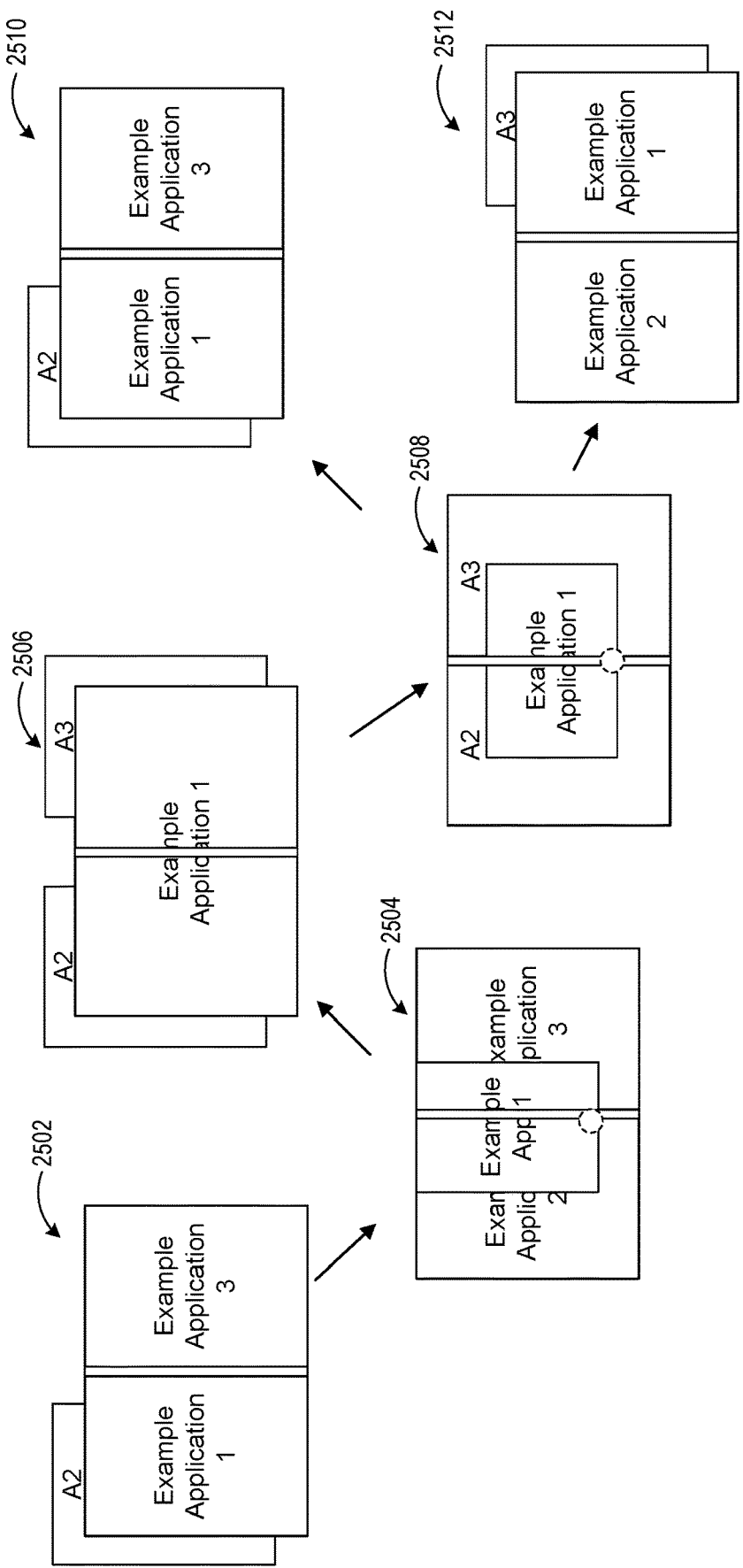
FIG. 25 shows an example user interface depicting spanning and contracting of an application when a second application is stacked behind the application, and a third application is open on another screen.

FIG. 25 shows spanning and contracting an application when a second application is stacked behind the application, and a third application is open on another display. At 2502, Application 1 is stacked over Application 2 on the first display, and Application 3 is displayed on the second display. At 2504, a user touch input moves Application 1 toward the seam. Application 1 is thereby spanned across both displays, stacking over both Application 2 on the first display and Application 3 on the second display, as shown at 2506. When the spanned application is contracted, at 2508, the application may stack above either the second application or the third application, depending to which side the application is contracted. At 2510, Application 1 is contracted to the first display, restoring Application 3 on the second display. At 2512, Application 1 is contracted to the second display, revealing Application 2 on the first display while Application 1 is stacked over Application 3 on the second display.

Figure 26:
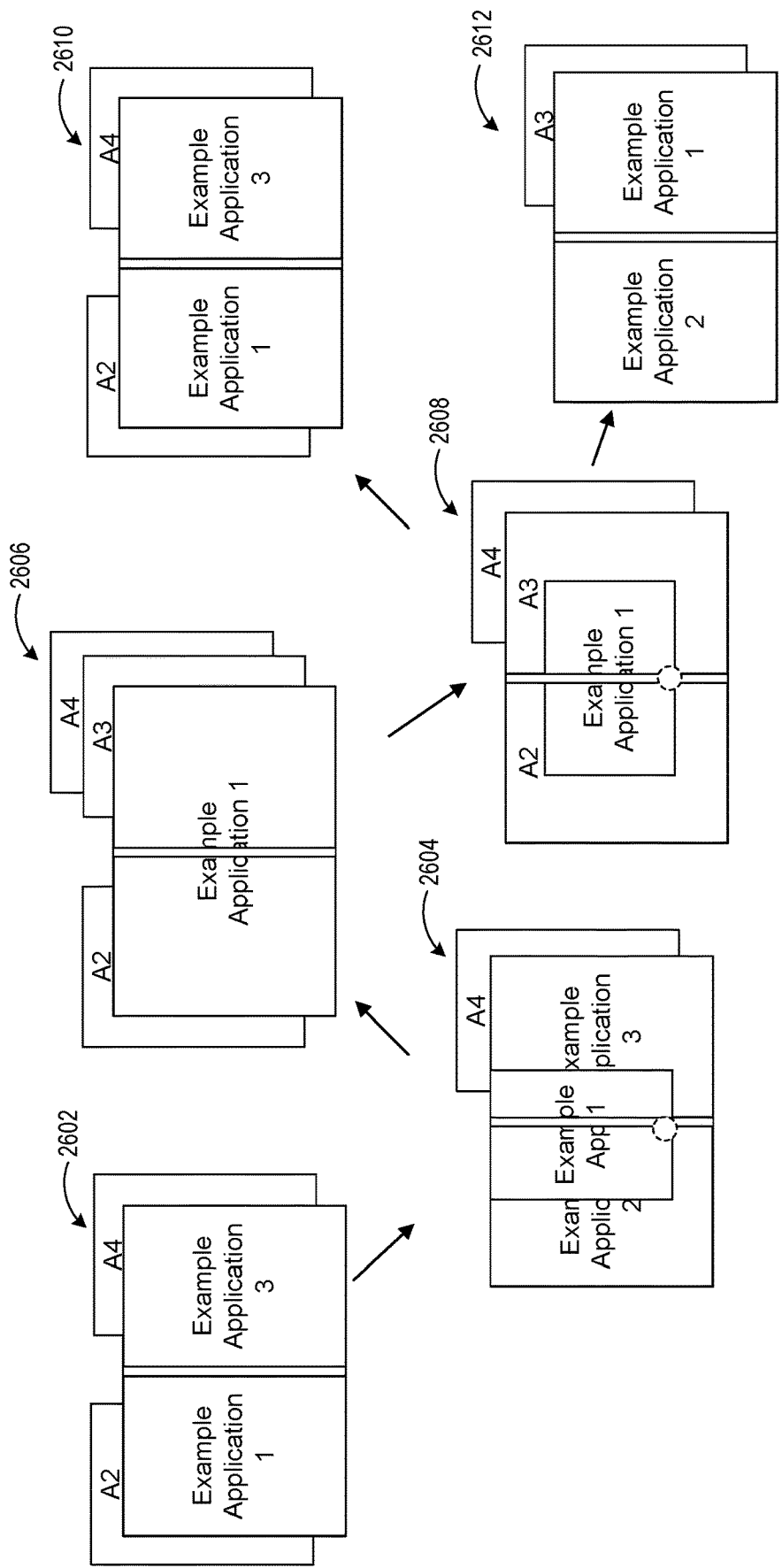
FIG. 26 shows an example user interface depicting spanning and contracting of an application when a second application is stacked behind the application, and two other applications are stacked on another screen.

FIG. 26 shows spanning and contracting an application when a second application is stacked behind the application, and two other applications are stacked on another display. At 2602, Application 1 is stacked over Application 2 on the first display, and Application 3 is stacked over Application 4 on the second display. At 2604, a user touch input moves Application 1 toward the seam. When Application 1 is spanned, as shown at 2606, Application 1 remains stacked over Application 2 on the left display, and further stacks over Application 3 and Application 4 on the right display. A user touch input then contracts Application 1, at 2608. When the user contracts Application 1 back to the left display, at 2610, Application 1 stacks back over Application 2 on the left display, while Application 3 and Application 4 remain stacked on the right display. In contrast, when the user contracts Application 1 on the right display, as shown at 2612, Application 1 stacks over Application 3, dismissing Application 4. This may occur, for example, if a setting dictates that only two applications may be stacked on a display at any time (other than when spanning). In other examples, more than two applications may be stacked at a time per display.

Figure 27:
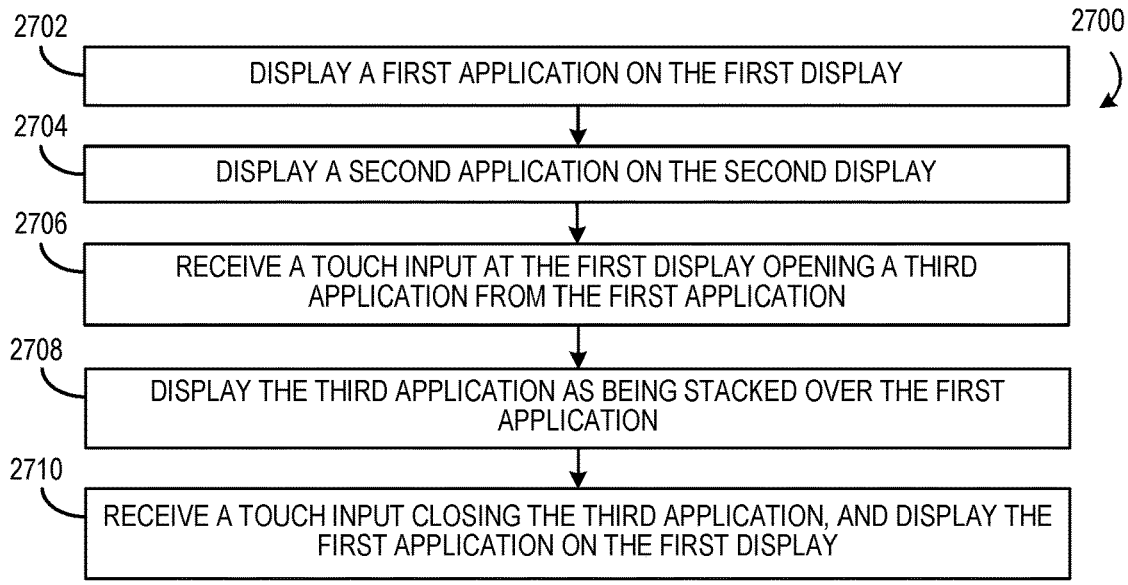
FIG. 27 shows an example method of operating a dual screen computing device.

FIG. 27 shows an example method 2700 of operating a dual screen computing device. Method 2700 comprises, at 2702, displaying a first application a first display, and at 2704, displaying a second application at a second display of the dual screen computing device. Method 2700 further includes, at 2706, receiving a touch input at the first display opening a third application while the first application is displayed on the first display, e.g. from a link within the first application. At 2708, method 2700 comprises displaying the third application as being stacked over the first application. At 2710, method 2700 includes receiving a touch input closing the third application, and in response, closing the third application and displaying the first application on the first display. The computing device may open new applications from currently running applications based on whether any application(s) are already open on either of the first display or the second display.

Figure 6B:
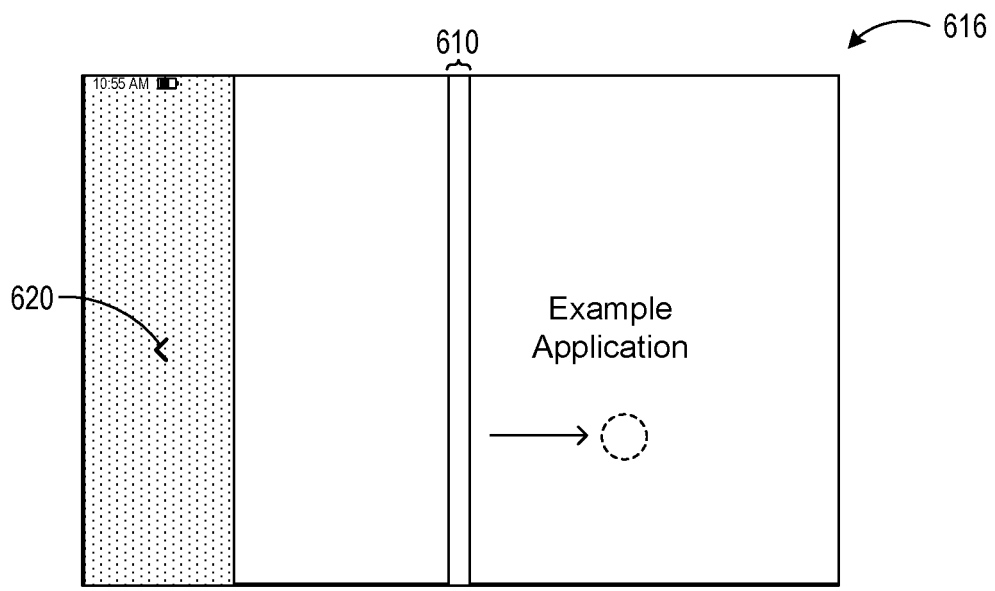

FIGS. 28A-E shows another example method 2800 of operating a dual-screen computing device, and more particularly illustrate various methods of displaying an application based upon the application being moved to different predetermined areas of the displays. Method 2800 includes, at 2802, receiving a touch input at the first display dragging the first application from the first display toward the second display. In some examples, this may include receiving the touch input at an application navigation bar (e.g. displayed at a bottom, side, or other suitable location on the display, as illustrated in FIG. 6). While the first application is being dragged, a size of the first application may be scaled based at least in part on a direction of movement of the touch input, at 2804. At 2806, method 2800 includes displaying a hint indicating where the application will move based at least in part on the touch input dragging the first application to within a predetermined area. For example, hint images indicating that the first application will be spanned, moved, swapped, or stacked may be displayed indicating a result of the movement of the first application based on the touch input dragging the first application if the touch input is completed.

Figure 28A:
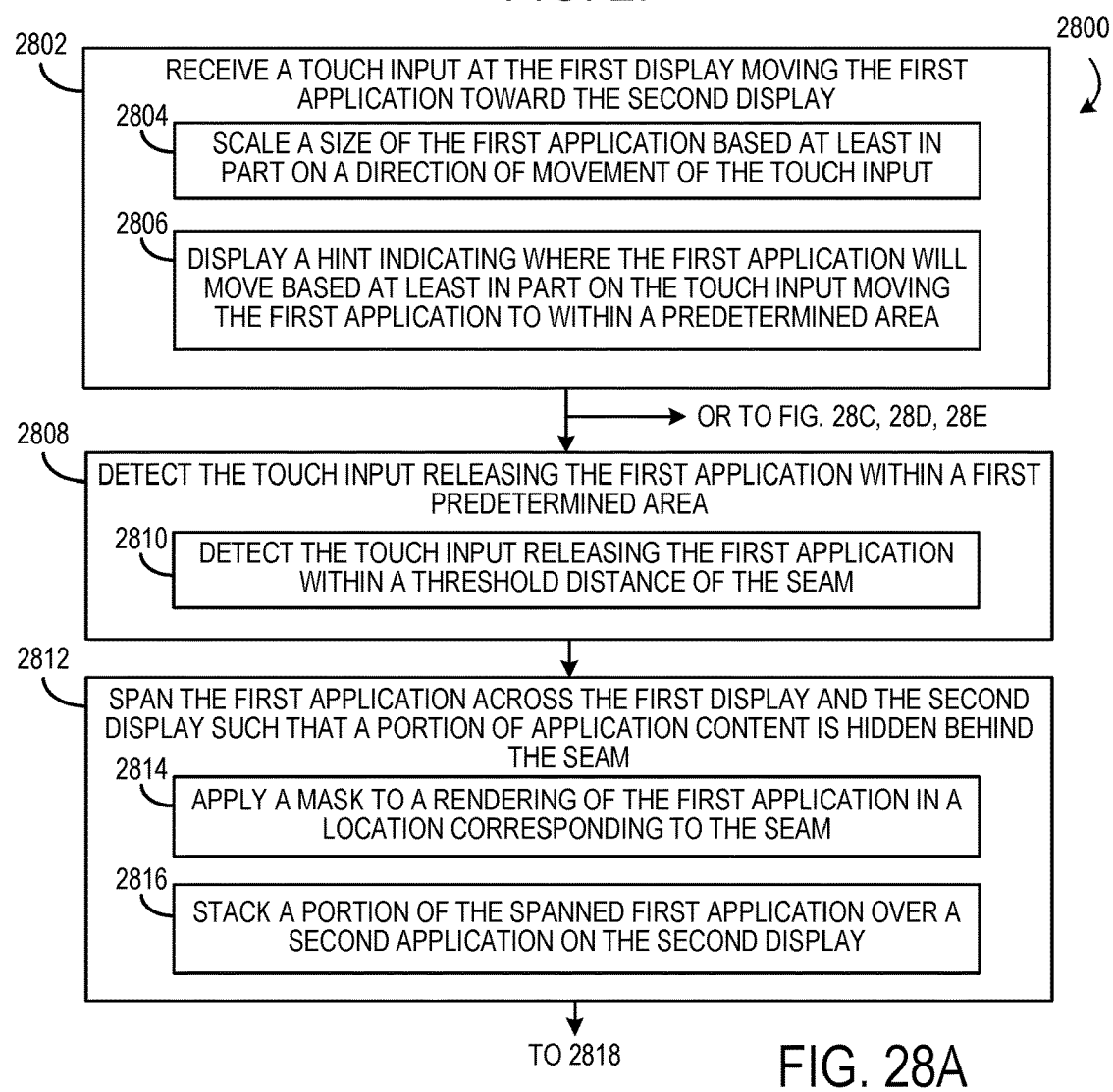
FIGS. 28A-28E show other example methods of operating a dual screen computing device.
Figure 28B:
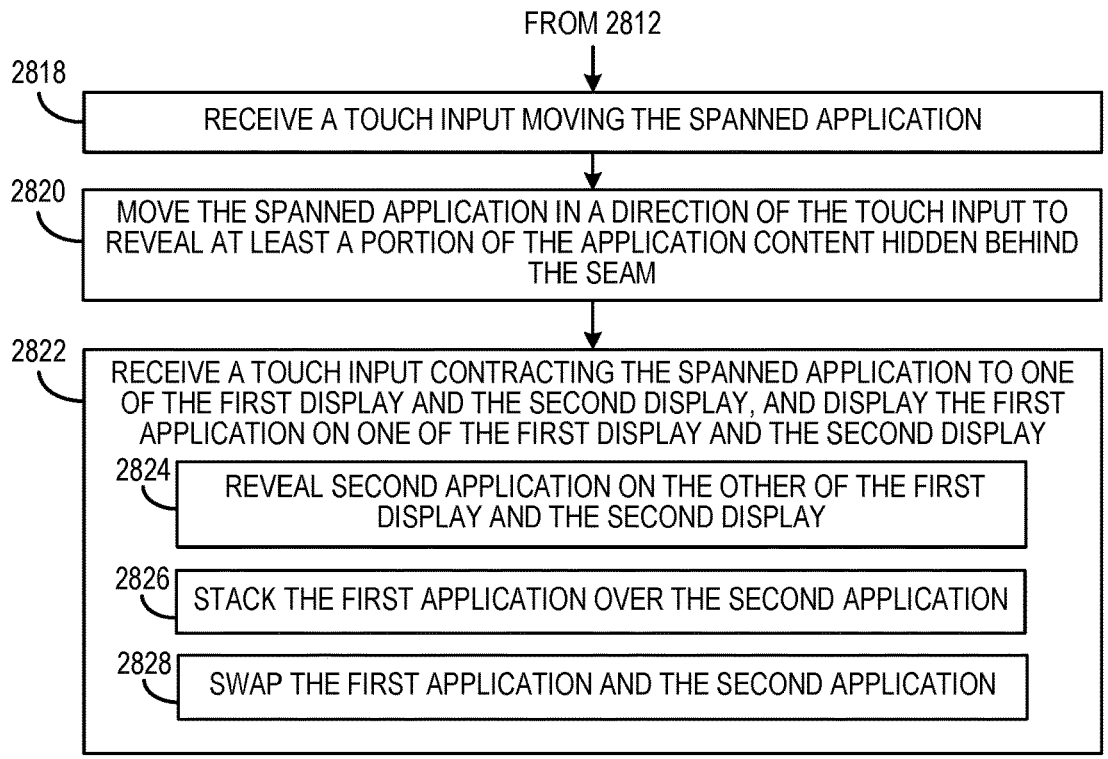
Figure 28C:
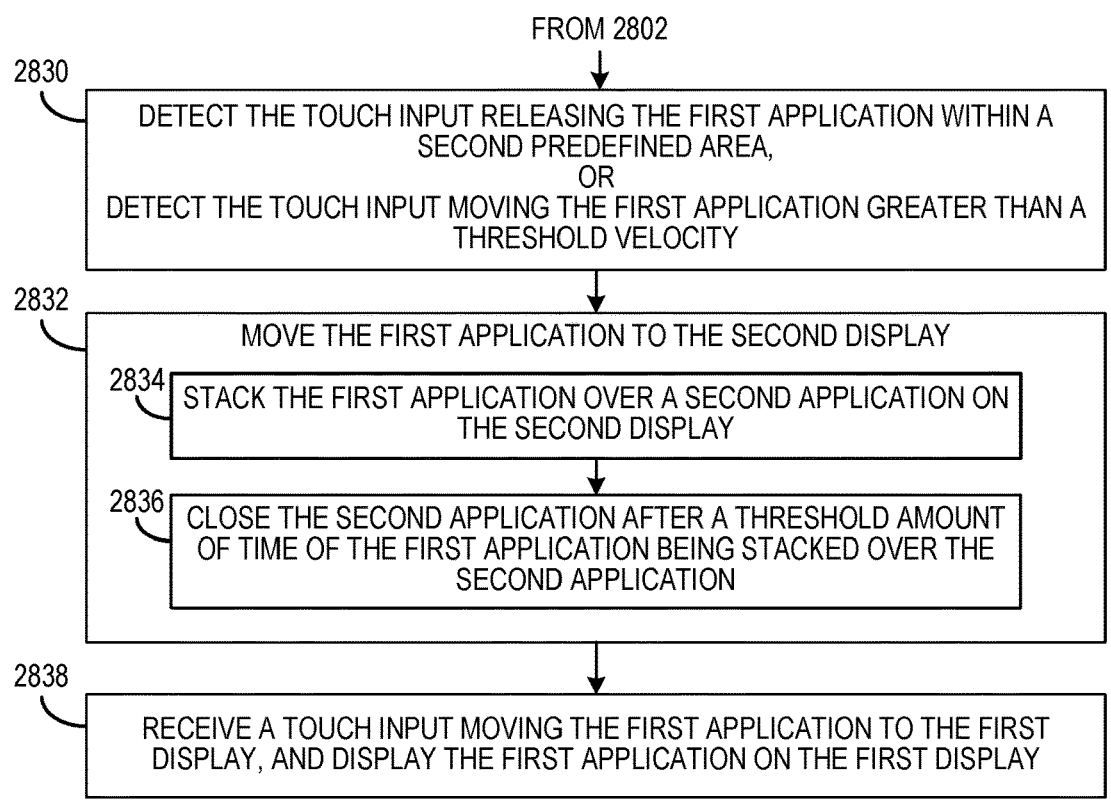
Figure 28D:
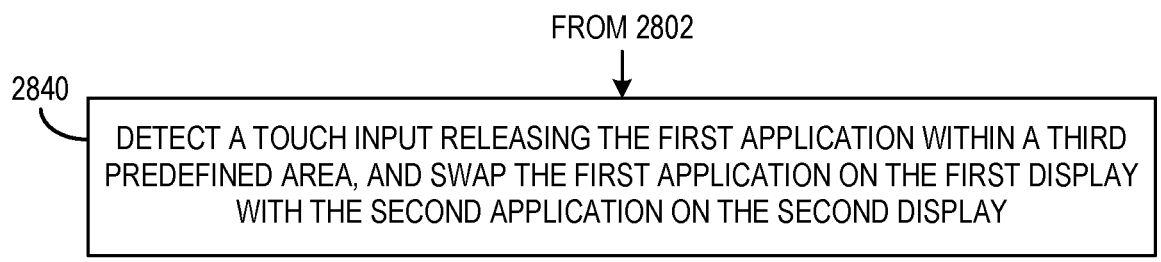
Figure 28E:
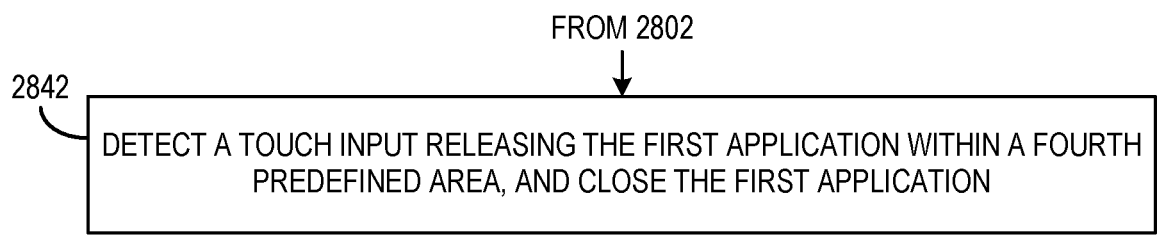

From 2802, method 2800 may continue to 2808 of FIG. 28A, or to FIG. 28C, 28D, or 28E, which illustrate different outcomes depending on where the first application is released.

For example, method 2800 may include, at 2808, detecting a touch input releasing the first application within a first predetermined area. This may include, at 2810, detecting the touch input releasing the first application within a threshold distance of a seam of the computing device in a hinge region of the device. In other examples, such a seam may not be present. At 2812, method 2800 includes spanning the application across the first display and the second display, such that a portion of application content is hidden behind the seam. Spanning may include, at 2824, applying a mask to a rendering of the first application in a location corresponding to a seam in between the first display and the second display. In other examples, an image of the first application may be divided such that the full image is split between the two displays.

Further, spanning may include, at 2816, stacking a portion of the spanned, first application over a second application on the second display, where a second application is open on the second display.

Continuing with FIG. 28B, method 2800 further includes, at 2818, receiving a touch input moving the spanned first application. Method 2800 also includes, at 2820, moving the spanned application in a direction of the touch input to reveal at least a portion of the application content hidden behind the seam. Further, method 2800 includes, at 2822, receiving a touch input moving and contracting the spanned application to either one of the first display and the second display, and displaying the first application on one of the first display and the second display based on the touch input. For example, a drag-and-release touch input or a fling gesture may contract the first application toward the first display, and the first application may be moved to the first display in response. In instances where the first application was stacked over the second application, moving the first application may reveal the second application, as indicated at 2824. As another example, the touch input may contract the first application onto the second display, such that the first application remains stacked over the second application, as shown at 2826, thereby potentially leading to the closing of the second application in some examples, e.g. immediately or after a threshold amount of time. As yet another example, the touch input may contract the first application onto the second display, such that the first application swaps positions with the second application, instead of stacking on top of the second application, as indicated at 2828.

Where the touch input is released in a different area than the first predefined area, a different result may occur than spanning. For example, FIG. 28C shows, at 2736, detecting the touch input releasing the first application within a second predefined area. In response, as indicated at 2832, the first application is moved to the second display, instead of being spanned across both displays. Such an action also may result from a fling gesture in which a touch input is moved from one of the first and second display toward the other of the first and second display with a velocity greater than a threshold velocity, and/or an acceleration greater than a threshold acceleration, also as indicated at 2830. Moving the first application to the second display may include, at 2834, stacking the first application over a second application on the second display. In some examples, the computing device may close the second application after a threshold amount of time of the first application being stacked over the second application, as shown at 2836. This may allow a user to move the stacked first application back to the first display to reveal the second application on the second display before the second application is closed. Thus, method 2800 further includes, at 2838, receiving a touch input moving the first application back to the first display, and in response, displaying the first application on the first display. Where the first application was stacked over a second application and moved within a threshold amount of time, this also may include displaying the second application on the second display.

In another example response to the touch input received at 2802, FIG. 28D shows, at 2842, detecting the touch input releasing the first application within a third predefined area, and swapping the first application on the first display with the second application on the second display. As yet another example response to the touch gesture of 2802, FIG. 28E shows, at 2842, detecting the touch input releasing the first application within a fourth predefined area, and closing the first application in response. The touch input may drag-and-release the first application in any other suitable predetermined areas to trigger other corresponding actions, such as moving an application to a recent applications list, etc.

Figure 29A:
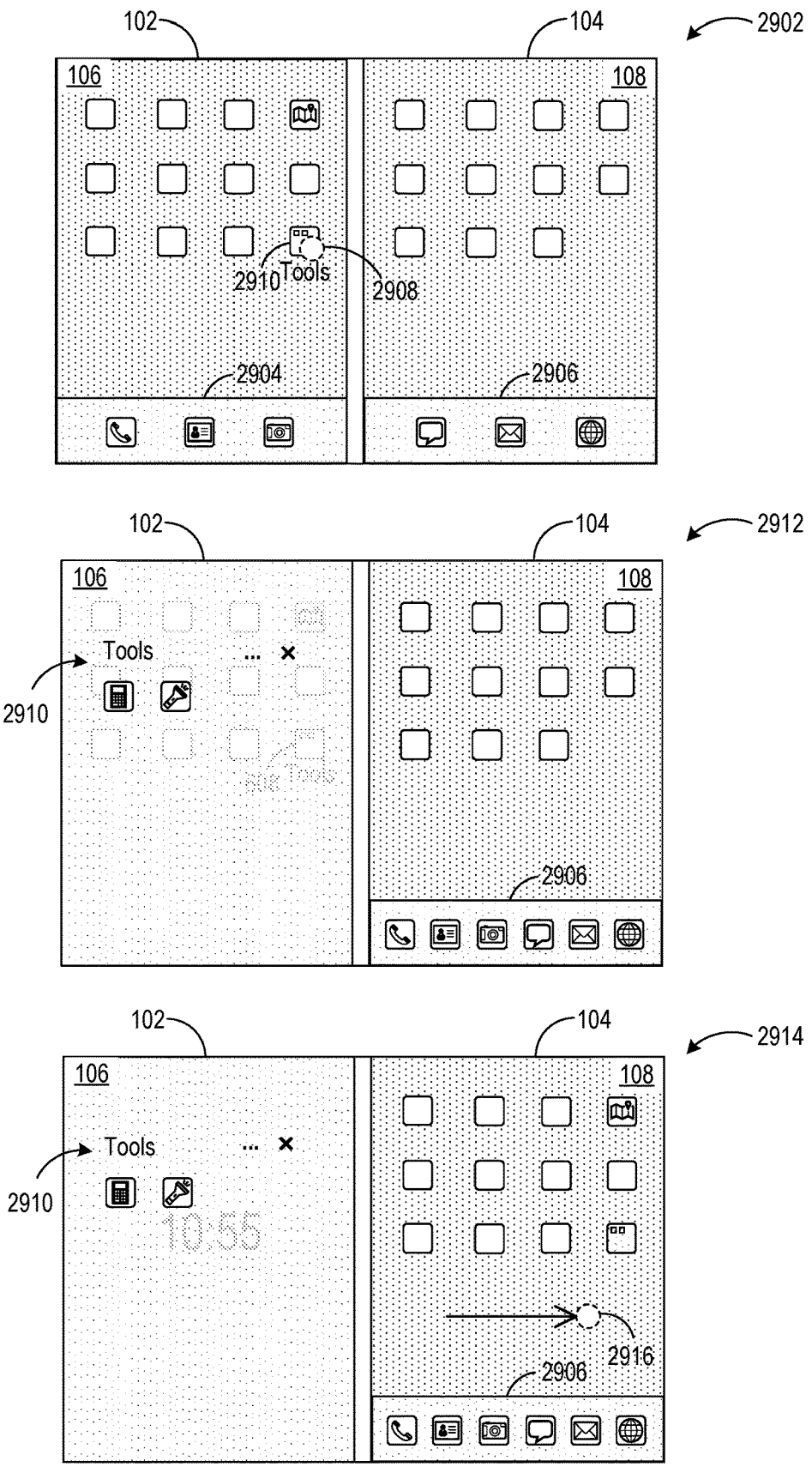
FIGS. 29A-29B show an example user interface depicting interactions with an applications folder, wherein pinned applications automatically move based on the interactions with the applications folder.
Figure 29B:
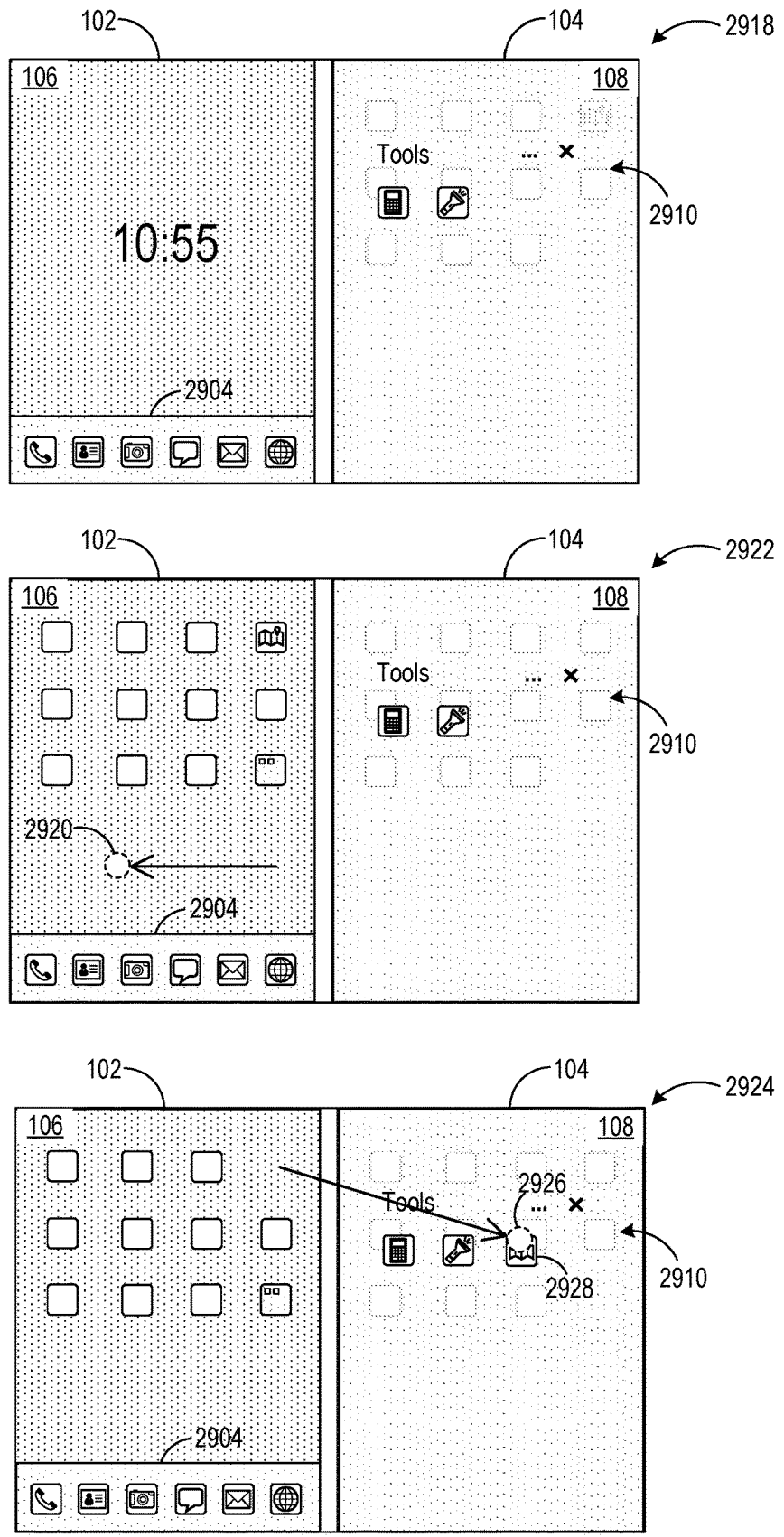

FIGS. 29A-B shows an example user interface depicting interactions with an applications folder in a double portrait mode of the dual-screen device 100. At 2902, the user interface shows a pinned applications bar 2904 on the first display 106 of the first portion 102, and a pinned applications bar 2906 on the second display 108 of the first portion 104. The user interface at 2902 also shows a touch input 2908 tapping an applications folder 2910 on the first display 106 display. At 2912, the applications folder 2910 is opened on the first display 106. The open applications folder 2910 may be at least partially transparent, such that content behind it is still visible. Further, the pinned applications that were on the pinned applications bar 2904 on the first display 106 are shifted over to the pinned applications bar 2906 on the second display 108. In some examples, the shifting may be animated so that a user views the transition of the pinned applications to the other display. It will be understood that shifting of the pinned applications may occur in any instance where an application or system component (e.g. a folder) occupies either screen in a dual-display mode. At 2914, a touch input 2916 performed on the second display 108 drags from left to right on the second display 108, which moves the items displayed behind the applications folder 2910 on the first display 106 to the second display 108. At any time, a user may close the applications folder 2910, e.g. by tapping an "X" icon shown in the folder.

Continuing with FIG. 29B, at 2918, the applications folder 2910 is opened on the second display 108, such as after a touch input has moved the applications folder from the first display 106 to the second display 108, or after touch inputs have closed the applications folder 2910 on the first display 106, and reopened the applications folder 2910 on the second display 108. The pinned applications that were previously on the pinned applications bar 2906 of the second display 108 are shifted to the pinned applications bar 2904 on the first display 106. Similarly, a touch input 2920 may be performed from right to left to shift content behind the applications folder 2910 on the second display 108 to the first display 106, as shown similarly at 2914. At 2924, while the applications folder 2910 is open, a touch input 2926 may move an application 2928 that is not currently in the applications folder 2910 into the folder 2910. It will be understood that pinned applications may also shift in response to the opening of an application on one display, and is not limited to the opening of an applications folder. Such behavior may allow the pinned applications to remain visible to a user.

In some examples, when no application or system component (e.g., folder) is open on either first display 106 or second display 108, a user may also shift the pinned applications that were on pinned applications bar 2904 on the first display 106 over to the pinned applications bar 2906 on the second display 108 through a right swipe/fling gesture, either within the pinned applications bar 2904 or a threshold area of pinned applications bar 2906. Similarly, the user may perform a left swipe/fling gesture either on pinned applications bar 2906 or pinned applications bar 2904 to shift the pinned applications that were previously on pinned applications bar 2096 on the second display 108 over to pinned applications bar 2094 on the first display 106. This gives the user the control to launch whichever pinned application on the preferred display. It will be understood that the above examples, including any other windowing gestures described above, also apply to double landscape poses as well, and the described gesture directions are relative.

Figure 30:
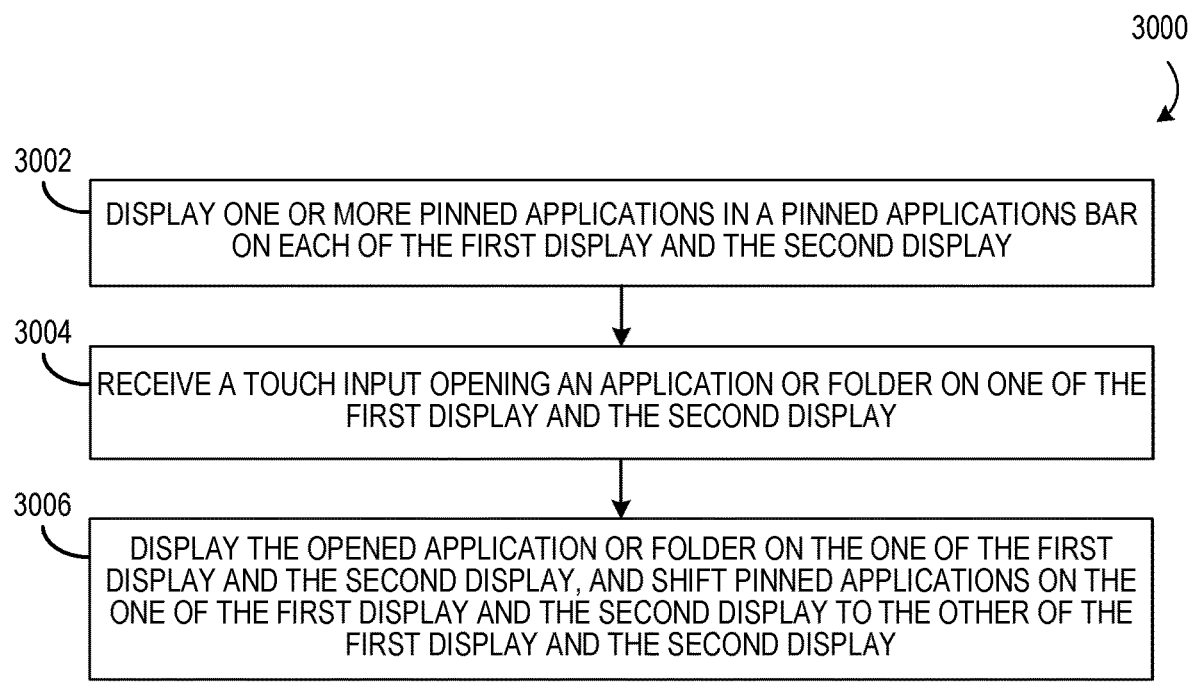
FIG. 30 shows another example method of operating a dual screen computing device.

FIG. 30 shows an example method 3000 of operating a dual screen computing device. Method 3000 includes, at 3002, displaying one or more applications in a pinned applications bar on each of the first display and the second display. Method 3000 further includes, at 3004, receiving a touch input opening an application or folder on one of the first display and the second display. In response, method 3000 includes, at 3006, displaying the opened application or folder on the one of the first display and the second display, and shifting pinned applications on the one of the first display and second display to the other of the first display and the second display. For example, if a touch input opens an application on the first display, the pinned applications in the pinned applications bar on the first display may shift to the pinned applications bar of the second display. Likewise, if a touch input opens an application on the second display, the pinned applications in the pinned applications bar on the second display may shift to the pinned applications bar of the first display. It will be understood that this may also apply when opening an applications folder, as described in regard to FIGS. 29A-B.

It will be understood that the various user interface examples described herein may apply to any suitable multiple display systems, including displays systems other than mobile phones, such as multi-monitor display systems for desktop computers, surface-mounted multi-displays, virtual and/or augmented reality display systems, head-up displays, projected display systems, etc. Furthermore, although described above in the context of touch inputs, it will be understood that any of the above touch inputs and gestures may also be input via a suitable input device, e.g. a mouse controlling a cursor.

In some embodiments, the methods and processes described herein may be tied to a computing system of one or more computing devices. In particular, such methods and processes may be implemented as a computer-application program or service, an application-programming interface (API), a library, and/or other computer-program product.

Figure 31:
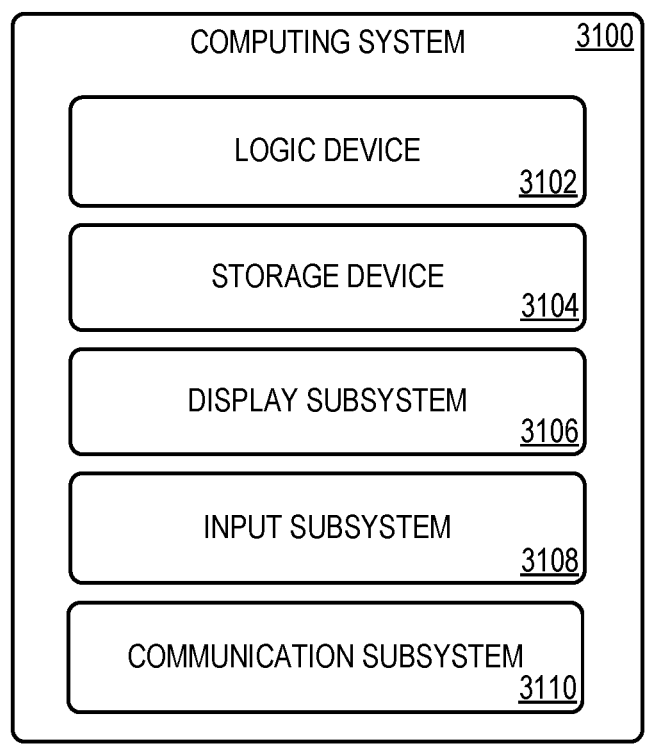
FIG. 31 shows a block diagram of an example computing system.

FIG. 31 schematically shows a non-limiting embodiment of a computing system 3100 that can enact one or more of the methods and processes described above. Computing system 3100 is shown in simplified form. Computing system 3100 may embody the computer device 100 described above and illustrated in FIG. 1. Computing system 3100 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 3100 includes a logic device 3102, and a non-volatile storage device 3104. Computing system 3100 may optionally include a display subsystem 3106, input subsystem 3108, communication subsystem 3110, and/or other components not shown in FIG. 31.

Logic device 3102 includes one or more physical devices configured to execute instructions. For example, the logic device 3102 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic device 3102 may include one or more physical processors (hardware) configured to execute software instructions. Additionally or alternatively, the logic device 3102 may include one or more hardware logic circuits or firmware devices configured to execute hardware-implemented logic or firmware instructions. Processors of the logic device 3102 may be single-core or multi-core, and the instructions executed thereon may be configured for sequential, parallel, and/or distributed processing. Individual components of the logic device 3102 optionally may be distributed among two or more separate devices, which may be remotely located and/or configured for coordinated processing. Aspects of the logic device 3102 may be virtualized and executed by remotely accessible, networked computing devices configured in a cloud-computing configuration. In such a case, these virtualized aspects are run on different physical logic processors of various different machines, it will be understood.

Storage device 3104 may be a non-volatile storage device. Non-volatile storage device 3104 includes one or more physical devices configured to hold instructions executable by the logic device 3102 to implement the methods and processes described herein. When such methods and processes are implemented, the state of non-volatile storage device 3104 may be transformed—e.g., to hold different data.

Non-volatile storage device 3104 may include physical devices that are removable and/or built-in. Non-volatile storage device 3104 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 3104 may include nonvolatile, dynamic, static, read/write, read-only, sequential-access, location-addressable, file-addressable, and/or content-addressable devices. It will be appreciated that storage device 3104 is configured to hold instructions even when power is cut to the storage device 3104.

In other examples, storage device 3104 may include volatile memory, which may include physical devices that include random access memory. Volatile memory is typically utilized by logic device 3102 to temporarily store information during processing of software instructions. It will be appreciated that volatile memory typically does not continue to store instructions when power is cut to the volatile memory.

Aspects of logic device 3102 and/or storage device 3104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 3106 may be used to present a visual representation of data held by storage device 3104. The visual representation may take the form of a graphical user interface (GUI). As the herein described methods and processes change the data held by the non-volatile storage device, and thus transform the state of the non-volatile storage device, the state of display subsystem 3106 may likewise be transformed to visually represent changes in the underlying data. Display subsystem 3106 may include one or more display devices utilizing virtually any type of technology. Such display devices may be combined with logic device 3102, volatile memory and/or non-volatile storage device 3104 in a shared enclosure, or such display devices may be peripheral display devices.

When included, input subsystem 3108 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 3110 may be configured to communicatively couple various computing devices described herein with each other, and with other devices. Communication subsystem 3110 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 3100 to send and/or receive messages to and/or from other devices via a network such as the Internet.

Another example provides a computing device, comprising a first portion comprising a first display and a first touch sensor, and a second portion comprising a second display and a second touch sensor, the second portion connected to the first portion via a hinge, the hinge defining a seam between the first display and the second display. the computing device further includes a logic device, and a storage device holding instructions executable by the logic device to receive a touch input at the first display moving an application that is currently displayed on the first display and not on the second display toward the second display, detect the touch input releasing the application within a predetermined area, span the application across the first display and the second display such that a portion of application content is hidden behind the seam, receive a touch input moving the spanned application, and move the spanned application in a direction of the touch input moving the spanned application to reveal at least a portion of the application content hidden behind the seam. The instructions may be additionally or alternatively executable to span the application across the first display and the second display by applying a mask to a rendering of the displayed application in a location corresponding to the seam. The instructions may be additionally or alternatively executable to receive a touch input moving the spanned application to one of the first display and the second display, and display the spanned application on one of the first display and the second display. The instructions may be additionally or alternatively executable to display one or more applications in a pinned applications bar on each of the first display and the second display, receive a touch input opening an applications folder on one of the first display and the second display, and in response, display the applications folder on the one of the first display and the second display, and shift applications on the one of the first display and the second display to the other of the first display and the second display. The predefined area may be a first predefined area, and the instructions may be additionally or alternatively executable to detect a touch input moving the application toward the second display and releasing the application within a second predefined area, and move the application to the second display. The application may be a first application, and the instructions may be additionally or alternatively executable to display a second application on the second display, upon detecting the touch input releasing the application within the second predefined area, stack the first application over the second application on the second display. The instructions may be additionally or alternatively executable to close the second application after a threshold amount of time of the first application being stacked over the second application. The application may be a first application, and the instructions may be additionally or alternatively executable to display a second application on the second display, detect a touch input releasing the application within a second predefined area, and swap the first application on the first display with the second application on the second display. The application may be a first application, and the instructions may be additionally or alternatively executable to display a second application on the second display, wherein spanning the first application across the first display and the second display comprises stacking a portion of the first application over the second application on the second display, receive a touch input contracting the first application, and display the first application on the first display, and display the second application on the second display. The predefined area may be a first predefined area, and the instructions may be additionally or alternatively executable to detect a touch input releasing the application within a second predefined area, and close the application. The instructions may be additionally or alternatively executable to detect a touch input comprising a fling gesture, and move the application to the second display. The instructions may be additionally or alternatively executable to scale a size of the application based at least in part on a direction of movement of the touch input. The instructions may be additionally or alternatively executable to, prior to detecting the touch input releasing the application, display a hint indicating that the application will span based at least in part on the touch input moving the application to within the predetermined area.

Another example provides a computing device, comprising a first portion comprising a first display and a first touch sensor, a second portion comprising a second display and a second touch sensor, the second portion connected to the first portion via a hinge, the hinge defining a seam between the first display and the second display, a logic device, and a storage device holding instructions executable by the logic machine to receive a touch input at the first display moving an application from the first display toward the second display, when the touch input releases the application within a first predefined area, move the application to the second display, and when the touch input releases the application within a second predetermined area, span the application by displaying the application across the first display and the second display. The application may be a first application, and the instructions may be additionally or alternatively executable to, display a second application on the second display, and when the user input releases the first application in a third predefined area, swap the first application on the first display with the second application on the second display by displaying the first application on the second display and displaying the second application on the first display. The application may be a first application, and the instructions may be additionally or alternatively executable to, display a second application on the second display, when the first application is displayed on the first display, receive a touch input at the first display opening a third application from the first application, and display the third application as being stacked over the first application. The instructions may be additionally or alternatively executable to receive a touch input closing the third application, and displaying the first application on the first display.

Another example provides a method enacted on a computing device, the computing device comprising a first portion comprising a first display and a first touch sensor, and a second portion comprising a second display and a second touch sensor, the second portion connected to the first portion via a hinge, the hinge defining a seam between the first display and the second display, the method comprising displaying a first application on the first display, displaying a second application on the second display, receiving a touch input at the first display moving the first application toward the second display, detecting the touch input releasing the application within a predetermined area, and stacking the first application over the second application on the second display based at least upon the touch input releasing the application within the predetermined area. The method may additionally or alternatively include receiving a touch input moving the first application to the first display, and in response, displaying the first application on the first display and displaying the second application on the second display. The method may additionally or alternatively include closing the second application after a threshold amount of time of the first application being stacked over the second application.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
    a first portion comprising a first display and a first touch sensor;
    a second portion comprising a second display and a second touch sensor, the second portion connected to the first portion via a hinge;
    a logic device; and
    a storage device holding instructions executable by the logic device to
        when the computing device is in a double portrait orientation, receive a first touch input at the first display moving an application that is currently displayed on the first display and not on the second display toward the second display,
        display the application at a scale that decreases as the first touch input moves the application away from a lower edge of the first display,
        based at least upon the first touch input releasing the application within a first predefined area, move the application to the second display and restore an original scale of the application, and
        when the computing device is in a double landscape orientation, receive a second touch input at the first display moving the application that is currently displayed on the first display and not the second display toward the second display, and
        display the application at a scale that decreases as the second touch input moves the application away from a side edge of the first display.

2. The computing device of claim 1, wherein the instructions are executable to, based at least upon the first touch input being detected as releasing the application within a second predefined area different than the first predefined area, span the application across the first display and the second display.

3. The computing device of claim 2, wherein the instructions are further executable to, after spanning the application, receive a touch input moving the application to one of the first display and the second display, and display the application on one of the first display and the second display.

4. The computing device of claim 1, wherein the instructions are executable to display one or more pinned applications in a pinned applications bar on each of the first display and the second display, receive a touch input opening a selected application on one of the first display and the second display, and in response, display the opened application on the one of the first display and the second display, and shift pinned applications on the one of the first display and the second display to the other of the first display and the second display.

5. The computing device of claim 1, wherein the instructions are further executable to, based at least upon the first touch input releasing the application within the first predefined area and the second display currently displaying a second application, stack the application on top of the second application.

6. The computing device of claim 1, wherein the application is a first application,
    and further comprising instructions executable to, based at least upon the first touch input releasing the application within a third predefined area and the second display currently displaying a second application, swap the application on the first display with the second application on the second display.

7. The computing device of claim 1, wherein the instructions are further executable to detect a touch input releasing the application within a second predefined area, and in response, close the application.

8. The computing device of claim 1, wherein the instructions are further executable to detect a touch input comprising a fling gesture, and based at least upon the application being displayed on the first display when the fling gesture is detected, move the application to the second display.

9. The computing device of claim 1, wherein the instructions are executable to, prior to detecting the first touch input releasing the application, display a hint indicating that the application will move to the second display based at least in part on the touch input moving the application to within the first predefined area.

10. A computing device, comprising:
    a first portion comprising a first display and a first touch sensor;
    a second portion comprising a second display and a second touch sensor, the second portion connected to the first portion via a hinge, the hinge defining a seam between the first display and the second display;
    a logic device; and
    a storage device holding instructions executable by the logic device to
        receive a first touch input at the first display moving an application from the first display toward the second display when the computing device is in a double portrait orientation,
        display the application at a scale that decreases as the first touch input moves the application away from a lower edge of the first display,
        display a first hint image on the second display based at least upon the first touch input moving the application to within a first predefined area and the second display currently not displaying a second application, the first hint image indicating that the application will move to the second display upon release,
        based at least upon the first touch input releasing the application within the first predefined area and the second display currently not displaying the second application, move the application to the second display and restore an original scale of the application, and
        when the computing device is in a double landscape orientation, receive a second touch input at the first display moving the application that is currently displayed on the first display and not the second display toward the second display, and display the application at a scale that decreases as the second touch input moves the application away from a side edge of the first display.

11. The computing device of claim 10, wherein instructions are further executable to,
    when the first application is displayed on the first display and the second application is displayed on the second display, receive a touch input at the first display opening a third application from the first application, and display the third application as being stacked over the first application.

12. The computing device of claim 11, wherein the instructions are executable to receive a touch input closing the third application, and displaying the first application on the first display.

13. A method enacted on a computing device, the computing device comprising a first portion comprising a first display and a first touch sensor, and a second portion comprising a second display and a second touch sensor, the second portion connected to the first portion via a hinge, the hinge defining a seam between the first display and the second display, the method comprising:
  displaying a first application on the first display,
  when the computing device is in a double portrait orientation,
    receiving a first touch input at the first display moving the first application toward the second display,
    displaying the first application at a scale that decreases as the first touch input moves the application away from a lower edge of the first display,
    based at least upon the first touch input releasing the application within a first predefined area, moving the application to the second display and restoring an original scale of the application, and
  when the computing device is in a double landscape orientation,
    receive a second touch input at the first display moving the application that is currently displayed on the first display and not the second display toward the second display, and
    display the application at a scale that decreases as the second touch input moves the application away from a side edge of the first display.

14. The method of claim 13, further comprising, based at least upon the first touch input releasing the application within a second predefined area, spanning the application across the first display and the second display.

15. The method of claim 13, further comprising, based at least upon the first touch input releasing the application within a third predefined area and the second display currently displaying a second application, swapping the application on the first display with the second application on the second display.

* * * * *